US012595630B2

(12) United States Patent
Veldboom et al.

(10) Patent No.: US 12,595,630 B2
(45) Date of Patent: Apr. 7, 2026

(54) VEHICLE WITH CURB CUTTER

(71) Applicant: Fluid System Components, DePere, WI (US)

(72) Inventors: John G. Veldboom, DePere, WI (US); Brendon J. Veldboom, DePere, WI (US); Benjamin C. Smith, DePere, WI (US); Carlos L. Villarreal, DePere, WI (US); Connor N. Gwynne, DePere, WI (US); Daniel D. Schraufnagel, DePere, WI (US); Gary D. Riha, DePere, WI (US)

(73) Assignee: FLUID SYSTEM COMPONENTS, Depere, WI (US)

( * ) Notice: Subject to any disclaimer, the term of this patent is extended or adjusted under 35 U.S.C. 154(b) by 110 days.

(21) Appl. No.: 18/533,087

(22) Filed: Dec. 7, 2023

(65) Prior Publication Data

US 2024/0191441 A1 Jun. 13, 2024

Related U.S. Application Data

(60) Provisional application No. 63/510,297, filed on Jun. 26, 2023, provisional application No. 63/431,797, filed on Dec. 12, 2022.

(51) Int. Cl.
*E01C 23/09* (2006.01)
*B23D 45/02* (2006.01)
*B23D 47/10* (2006.01)

(52) U.S. Cl.
CPC ........ *E01C 23/0933* (2013.01); *B23D 45/028* (2013.01); *B23D 47/10* (2013.01)

(58) Field of Classification Search
CPC .... E01C 23/0933; B23D 45/028; B23D 47/10
See application file for complete search history.

(56) References Cited

U.S. PATENT DOCUMENTS

| | | | | |
|---|---|---|---|---|
| 3,649,071 A | * | 3/1972 | Graff | E01C 23/094 404/90 |
| 3,779,606 A | * | 12/1973 | Hatcher | E01C 23/088 299/39.2 |

(Continued)

FOREIGN PATENT DOCUMENTS

| | | | | |
|---|---|---|---|---|
| CA | 1172140 A | * | 8/1984 | B23D 45/024 |
| CA | 1253420 A | * | 5/1989 | B23D 45/024 |

(Continued)

*Primary Examiner* — Jong-Suk (James) Lee
(74) *Attorney, Agent, or Firm* — Foley & Lardner LLP

(57) ABSTRACT

A vehicle includes an engine and a curb cutting assembly. The curb cutting assembly is mounted on the chassis. The curb cutting assembly includes a main beam, a saw assembly, vertical cylinders, horizontal cylinders, pivot cylinders, and a pump. The vertical cylinders are configured to raise and lower the main beam in a vertical direction. The horizontal cylinders are configured to extend or retract the main beam in a lateral direction. The pivot cylinders are configured to extend or retract to pivot the main beam, the horizontal cylinders, and the vertical cylinders about a longitudinal direction. The pump is configured to be driven by the engine and pressurize hydraulic fluid for the saw assembly, the vertical cylinders, the horizontal cylinders, and the pivot cylinders.

20 Claims, 24 Drawing Sheets

Fig. 4

(56) References Cited

U.S. PATENT DOCUMENTS

| | | | | |
|---|---|---|---|---|
| 3,785,705 | A * | 1/1974 | Binger | B23D 45/028 |
| | | | | 30/379 |
| 4,175,886 | A * | 11/1979 | Moench | E01C 23/121 |
| | | | | 172/464 |
| 4,433,871 | A * | 2/1984 | Bertrand | E01C 11/222 |
| | | | | 30/379.5 |
| 4,792,190 | A * | 12/1988 | Bertrand | B23D 45/024 |
| | | | | 404/90 |
| 5,135,287 | A * | 8/1992 | Karnes | B23D 47/02 |
| | | | | 404/90 |
| 5,230,270 | A * | 7/1993 | Bertrand | B23D 45/048 |
| | | | | 30/379.5 |
| 6,158,817 | A * | 12/2000 | Bertrand | B28D 1/045 |
| | | | | 299/72 |
| 7,451,757 | B2 * | 11/2008 | Ketterhagen | B28D 1/045 |
| | | | | 299/39.3 |
| 8,931,853 | B1 * | 1/2015 | Taylor, Jr. | B28D 1/044 |
| | | | | 299/72 |
| 2003/0194273 | A1 * | 10/2003 | Lloyd | E01C 23/065 |
| | | | | 404/83 |
| 2008/0008527 | A1 * | 1/2008 | Kraemer | E01C 23/088 |
| | | | | 404/94 |
| 2010/0242195 | A1 * | 9/2010 | Day | E01H 1/005 |
| | | | | 15/49.1 |
| 2015/0135863 | A1 * | 5/2015 | Dalum | B60K 6/00 |
| | | | | 180/65.21 |
| 2024/0371591 | A1 * | 11/2024 | Saito | H01H 39/00 |

FOREIGN PATENT DOCUMENTS

| | | | | |
|---|---|---|---|---|
| CA | 2359185 C * | 4/2007 | | E01C 23/0933 |
| FR | 2779453 A1 * | 12/1999 | | E01C 19/187 |
| WO | WO-9924738 A1 * | 5/1999 | | F16H 47/04 |

* cited by examiner

1800

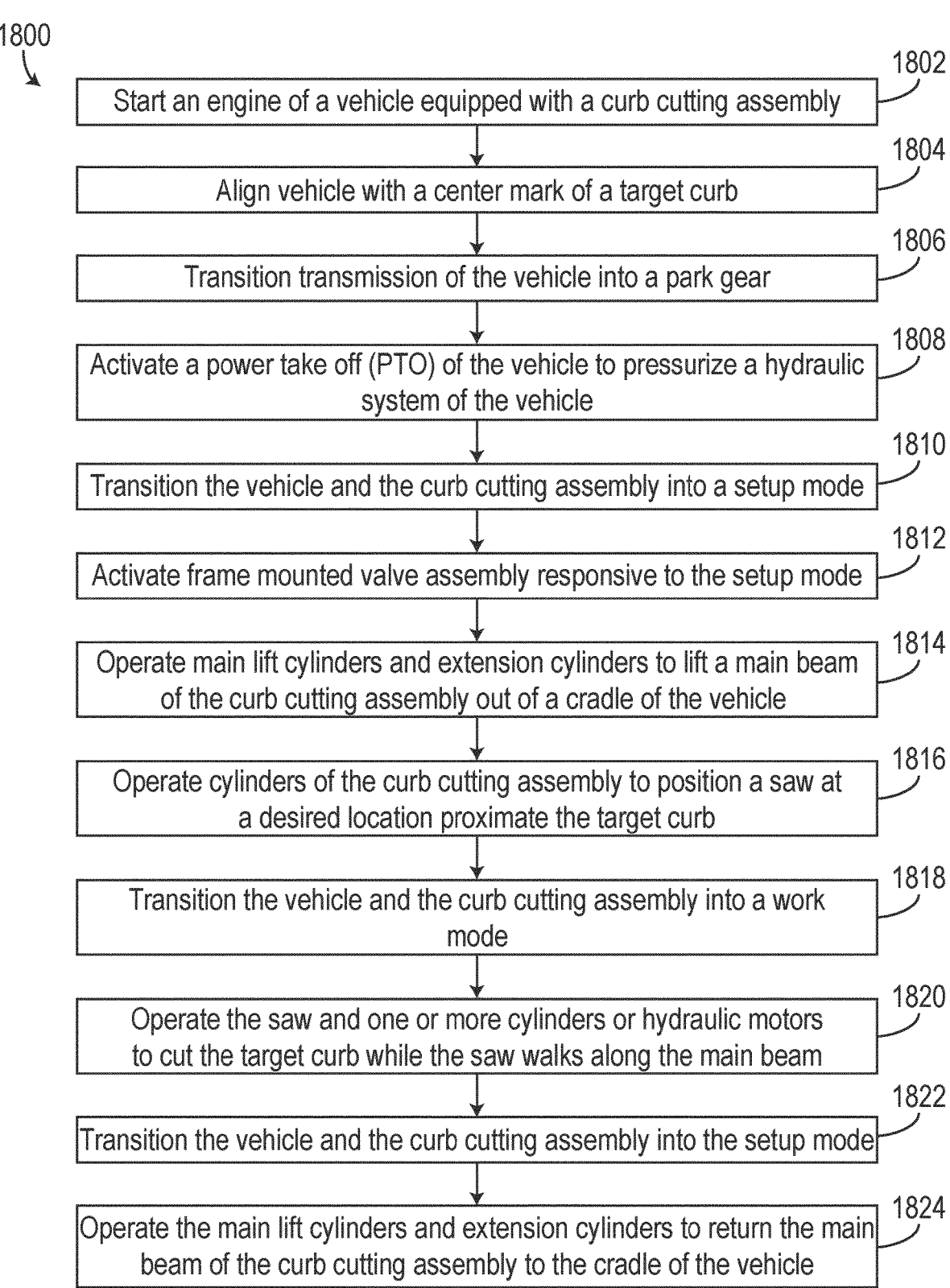

1802
Start an engine of a vehicle equipped with a curb cutting assembly

1804
Align vehicle with a center mark of a target curb

1806
Transition transmission of the vehicle into a park gear

1808
Activate a power take off (PTO) of the vehicle to pressurize a hydraulic system of the vehicle 1810
Transition the vehicle and the curb cutting assembly into a setup mode 1812
Activate frame mounted valve assembly responsive to the setup mode 1814
Operate main lift cylinders and extension cylinders to lift a main beam of the curb cutting assembly out of a cradle of the vehicle 1816
Operate cylinders of the curb cutting assembly to position a saw at a desired location proximate the target curb 1818
Transition the vehicle and the curb cutting assembly into a work mode 1820
Operate the saw and one or more cylinders or hydraulic motors to cut the target curb while the saw walks along the main beam 1822
Transition the vehicle and the curb cutting assembly into the setup mode 1824
Operate the main lift cylinders and extension cylinders to return the main beam of the curb cutting assembly to the cradle of the vehicle

VEHICLE WITH CURB CUTTER

CROSS-REFERENCE TO RELATED PATENT APPLICATIONS

This application claims the benefit of and priority to U.S. Provisional Application No. 63/431,797, filed Dec. 12, 2022, and U.S. Provisional Application No. 63/510,297, filed Jun. 26, 2023, both of which are incorporated herein by reference in their entireties.

BACKGROUND

The present disclosure relates generally to a commercial vehicle. More specifically, the present disclosure relates to a curb cutting implement for a commercial vehicle.

SUMMARY

One embodiment of the present disclosure is a vehicle. The vehicle includes an engine and a curb cutting assembly. The curb cutting assembly is mounted on the chassis. The curb cutting assembly includes a main beam, a saw assembly, vertical cylinders, horizontal cylinders, pivot cylinders, and a pump. The vertical cylinders are configured to raise and lower the main beam in a vertical direction. The horizontal cylinders are configured to extend or retract the main beam in a lateral direction. The pivot cylinders are configured to extend or retract to pivot the main beam, the horizontal cylinders, and the vertical cylinders about a longitudinal direction. The pump is configured to be driven by the engine and pressurize hydraulic fluid for the saw assembly, the vertical cylinders, the horizontal cylinders, and the pivot cylinders.

In some embodiments, the saw assembly includes a carriage, a first hydraulic motor, a second hydraulic motor, and an extension cylinder. The carriage is configured to support a concrete saw. The first hydraulic motor is configured to drive the concrete saw. The second hydraulic motor is configured to drive a pinion gear. The saw extension cylinder is configured to extend or retract to move the concrete saw along a slot of the carriage.

In some embodiments, the main beam includes an edge configured to support the carriage of the saw assembly. The main beam further includes a rack configured to engage the pinion gear, according to some embodiments. In some embodiments, the second hydraulic motor is configured to drive the pinion gear that engages the rack to transport the saw assembly along the main beam.

In some embodiments, the vehicle further includes a power take off (PTO). The PTO is selectably transitionable between an engaged state such that the engine is rotationally coupled with and drives the pump, and a disengaged state such that the engine is rotationally de-coupled from the pump.

In some embodiments, the curb cutting assembly is operable to position the saw assembly proximate a curb, plunge a saw blade of the saw assembly into the curb while driving the saw blade, and transport the saw assembly along the main beam to cut the curb. In some embodiments, the main beam includes a medial portion, and a pair of end portions positioned at opposite ends of the medial portion. The end portions are pivotally coupled with the medial portion so that the saw assembly is rotatable to perform an angled cut of a curb while operating and transporting along one of the end portions of the main beam.

In some embodiments, the saw assembly includes a carriage and a pair of elongated members. The pair of elongated members are pivotally coupled with the carriage and configured to be driven to rotate relative to the carriage by an actuator. The pair of elongated members define a slot for a concrete saw of the saw assembly configured to cut the curb. The carriage is configured to travel along the main beam.

Another embodiment of the present disclosure is a curb cutting assembly for a vehicle. The curb cutting assembly includes a main beam, a saw assembly, vertical cylinders, horizontal cylinders, pivot cylinders, and a pump. The saw assembly is configured to transport along the main beam. The vertical cylinders are configured to raise and lower the main beam in a vertical direction. The horizontal cylinders are configured extend or retract the main beam in a lateral direction. The pivot cylinders are configured to extend or retract to pivot the main beam, the horizontal cylinders, and the vertical cylinders about a longitudinal direction. The pump is configured to be driven by the engine and pressurize hydraulic fluid for the saw assembly, the vertical cylinders, the horizontal cylinders, and the pivot cylinders. The curb cutting assembly is mounted on the vehicle with the main beam extending longitudinally along the vehicle.

In some embodiments, the saw assembly includes a carriage, a first hydraulic motor, a second hydraulic motor, and a saw extension cylinder. The carriage is configured to support a concrete saw. The first hydraulic motor is configured to drive the concrete saw. The second hydraulic motor is configured to drive a pinion gear. The saw extension cylinder is configured to extend or retract to move the concrete saw along a slot of the carriage.

In some embodiments, the main beam includes an edge configured to support the carriage of the saw assembly. The main beam further includes a rack configured to engage the pinion gear. The second hydraulic motor is configured to drive the pinion gear that engages the rack to transport the saw assembly along the main beam.

In some embodiments, the curb cutting assembly includes a power take off (PTO). The PTO is selectably transitionable between an engaged state such that the engine is rotationally coupled with and drives the pump, and a disengaged state such that the engine is rotationally de-coupled from the pump.

In some embodiments, the curb cutting assembly is operable to position the saw assembly proximate a curb, plunge a saw blade of the saw assembly into the curb while driving the saw blade, and transport the saw assembly along the main beam to cut the curb. In some embodiments, the main beam includes a medial portion, and a pair of end portions positioned at opposite ends of the medial portion. The end portions are pivotally coupled with the medial portion so that the saw assembly is rotatable to perform an angled cut of a curb while operating and transporting along one of the end portions of the main beam.

In some embodiments, the saw assembly includes a carriage and a pair of elongated members. The pair of elongated members are pivotally coupled with the carriage and configured to be driven to rotate relative to the carriage by an actuator. The pair of elongated members define a slot for a concrete saw. The carriage is configured to travel along the main beam.

Another embodiment of the present disclosure is a system for cutting a curb. The system includes a vehicle, and a curb cutting assembly. The vehicle includes a chassis, tractive elements, and a primary mover. The primary mover is configured to drive the tractive elements to transport the vehicle. The curb cutting assembly is coupled with the chassis. The curb cutting assembly includes a saw assembly configured to transport along a main beam. The main beam is configured to be driven to raise or lower relative to the chassis in a vertical direction, extend or retract in a lateral direction from a side of the vehicle, and pivoted about a longitudinal direction. The curb cutting assembly is configured to cut a section out of the curb.

In some embodiments, the saw assembly includes a carriage and a pair of elongated members. The pair of elongated members are pivotally coupled with the carriage and configured to be driven to rotate relative to the carriage by an actuator. The pair of elongated members define a slot for a concrete saw. The carriage is configured to travel along the main beam.

In some embodiments, the curb cutting assembly includes vertical cylinders, horizontal cylinders, pivot cylinders, and a pump. In some embodiments, the vertical cylinders are configured to raise and lower the main beam in the vertical direction. In some embodiments, the horizontal cylinders are configured to extend or retract the main beam in the lateral direction. In some embodiments, the pivot cylinders are configured to extend or retract to pivot the main beam, the horizontal cylinders, and the vertical cylinders about the longitudinal direction. The pump is configured to pressurize hydraulic fluid for the saw assembly, the vertical cylinders, the horizontal cylinders, and the pivot cylinders.

In some embodiments, the saw assembly includes a carriage, a first hydraulic motor, a second hydraulic motor, and a saw extension cylinder. The carriage is configured to support a concrete saw. The first hydraulic motor is configured to drive the concrete saw. The second hydraulic motor is configured to drive a pinion gear. The saw extension cylinder is configured to extend or retract to move the concrete saw along a slot of the carriage.

In some embodiments, the curb cutting assembly is operable to position the saw assembly proximate the curb, plunge a saw blade of the saw assembly into the curb while driving the saw blade, and transport the saw assembly along the main beam to cut the curb. In some embodiments, the main beam includes a medial portion, and a pair of end portions positioned at opposite ends of the medial portion. The end portions are pivotally coupled with the medial portion so that the saw assembly is rotatable to perform an angled cut of a curb while operating and transporting along one of the end portions of the main beam.

BRIEF DESCRIPTION OF THE DRAWINGS

FIG. 18 is a flow diagram of a process for cutting a curb using a curb cutting system of a vehicle or trailer, according to some embodiments.

FIG. 19 is block diagram of a hydraulic system of the curb cutting vehicle of FIG. 1, according to some embodiments.

DETAILED DESCRIPTION

Figure 1:
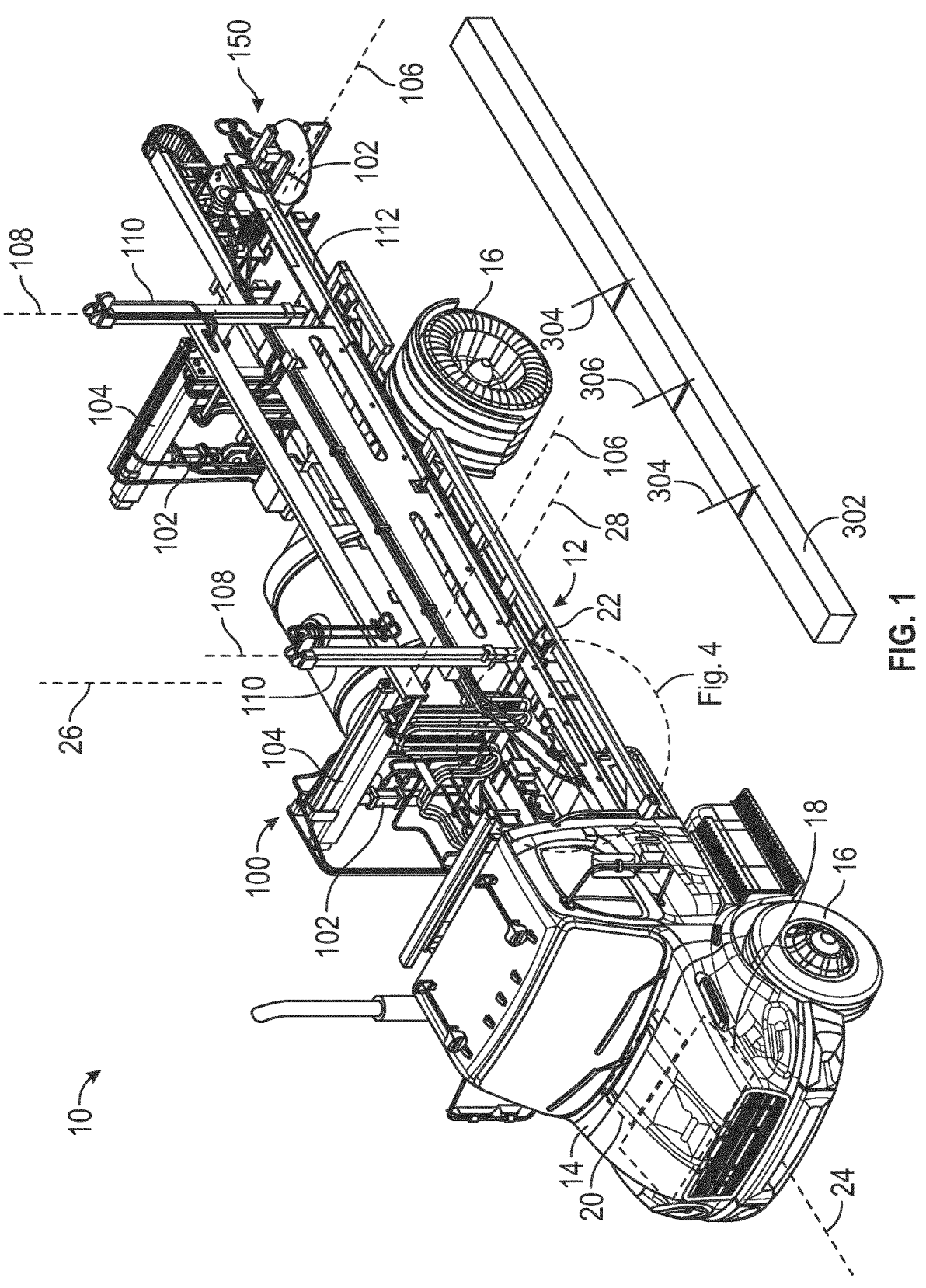
FIG. 1 is a perspective view of a curb cutting vehicle, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment a vehicle includes a curb cutting assembly that is mounted to a frame of the vehicle. The curb cutting assembly includes a concrete saw that may be driven by a hydraulic motor or an electric motor. The curb cutting assembly can include a track, a main beam, a wing, etc., that is coupled with the frame of the vehicle through one or more repositionable cylinders. The concrete saw may be installed on a carriage that is configured to transport or walk along a length of the track to perform a cut.

Curb Cutting Vehicle

Referring to FIGS. 1-16, a vehicle 10 (e.g., a curb cutter, a curb cutting vehicle, a commercial vehicle, a truck, etc.) includes a frame 12 (e.g., a chassis, a structural member, a frame assembly), a cab 14 (e.g., a body, a cabin, a cabin assembly, a seating space, a driver's cab, etc.) coupled with the frame 12, and tractive elements 16 (e.g., wheels, rotatable members, etc.) rotatably coupled with the frame 12. The vehicle 10 also includes a prime mover 18 (e.g., an engine, a diesel engine, an internal combustion engine, a fuel-supplied engine, a gasoline engine, an electric motor, a fuel cell, a hybrid internal combustion engine/electric motor, etc.) and a transmission 20. The prime mover 18 is configured to provide a torque or mechanical energy output to the tractive elements 16 through the transmission 20 (and one or more driveshafts, differentials, etc.) to drive the tractive elements 16 to rotate to transport the vehicle 10.

The vehicle 10 also includes a curb cutting assembly 100 that is coupled with and supported by the frame 12. In some embodiments, the curb cutting assembly 100 is configured to couple a saw assembly 150 with the vehicle 10 so that the saw assembly 150 can be transported to various job locations. The saw assembly 150 is coupled with the vehicle 10 (e.g., the frame 12) through the curb cutting assembly 100 or components thereof so that the saw assembly 150 can be moved and translated relative to the vehicle 10 (e.g., relative to the frame 12) in order to cut a curb 302 while remaining coupled with the vehicle 10. In some embodiments, the curb cutting assembly 100 is an arm or wing assembly including one or more movable components so that the saw assembly 150 can be translated and/or rotated through space to perform a cutting operation of the curb 302. In some embodiments, the curb cutting assembly 100 is operable by a human machine interface (HMI) and/or a remote control so that the saw assembly 150 can be repositioned and moved in order to perform a desired cut of the curb 302. In some embodiments, an operator or user may place one or more markers, including end of cut markers 304, and a center of cut marker 306. The markers 304 and 306 may be used to align a saw assembly (e.g., a concrete saw) for cutting the curb 302. It should be understood that while the curb cutting assembly 100 is shown configured to cut a curb on a lateral side of the vehicle 10, the curb cutting assembly 100 may similarly be oriented or configured to cut a curb on a rear side of the vehicle 10. In some embodiments, the curb cutting assembly 100 is configured to be mounted on a rear of a pickup truck, or as an implement of a skid steer. In some embodiments, the markers 304 are digital markers (e.g., air tags) and a control system of the curb cutting assembly 100 uses ultra wide band (UWB) communications to determine where to start a cut of the curb 302 and where to stop a cut of the curb 302.

The vehicle 10 includes or defines a longitudinal axis 24 that defines a longitudinal direction (e.g., a forwards and rearwards direction along the longitudinal axis 24). The frame 12 may extend in a lengthwise direction along or define the longitudinal axis 24. The vehicle 10 also includes or defines a lateral axis 28 that defines a lateral direction. The lateral axis 28 is perpendicular to the longitudinal axis 24 and extends in a widthwise direction of the frame 12. The lateral axis 28 may define left or right directions of the vehicle 10. The vehicle 10 also includes or defines a vertical axis 26 (e.g., a vertical direction) that is perpendicular to both the longitudinal axis 24 (e.g., a longitudinal direction) and the lateral axis 28 (e.g., a lateral direction). The vertical axis 26 may define an upwards or downwards direction relative to the vehicle 10.

The curb cutting assembly 100 includes or is coupled with the frame 12 through a cradle assembly 22 (e.g., a frame, a cradle, a carriage, etc.). The cradle assembly 22 may be directly fixedly coupled with the frame 12 and defines one or more surfaces to support various portions of the curb cutting assembly 100. The cradle assembly 22 can include multiple laterally extending members that extend in lateral direction, and are spaced apart in the longitudinal direction along the frame 12. In some embodiments, the cradle assembly 22 defines a recess 180 configured to receive a wing 112 (e.g., an elongated member, a main beam, etc.) of the curb cutting assembly 100. The wing 112 (e.g., an elongated member, a structural member, a support member, a linkage, etc.) may be transitionable into a transportation position as shown in FIG. 8 so that the wing 112 rests upon an upper surface of the cradle assembly 22 defined by the recess 180.

Figure 8:
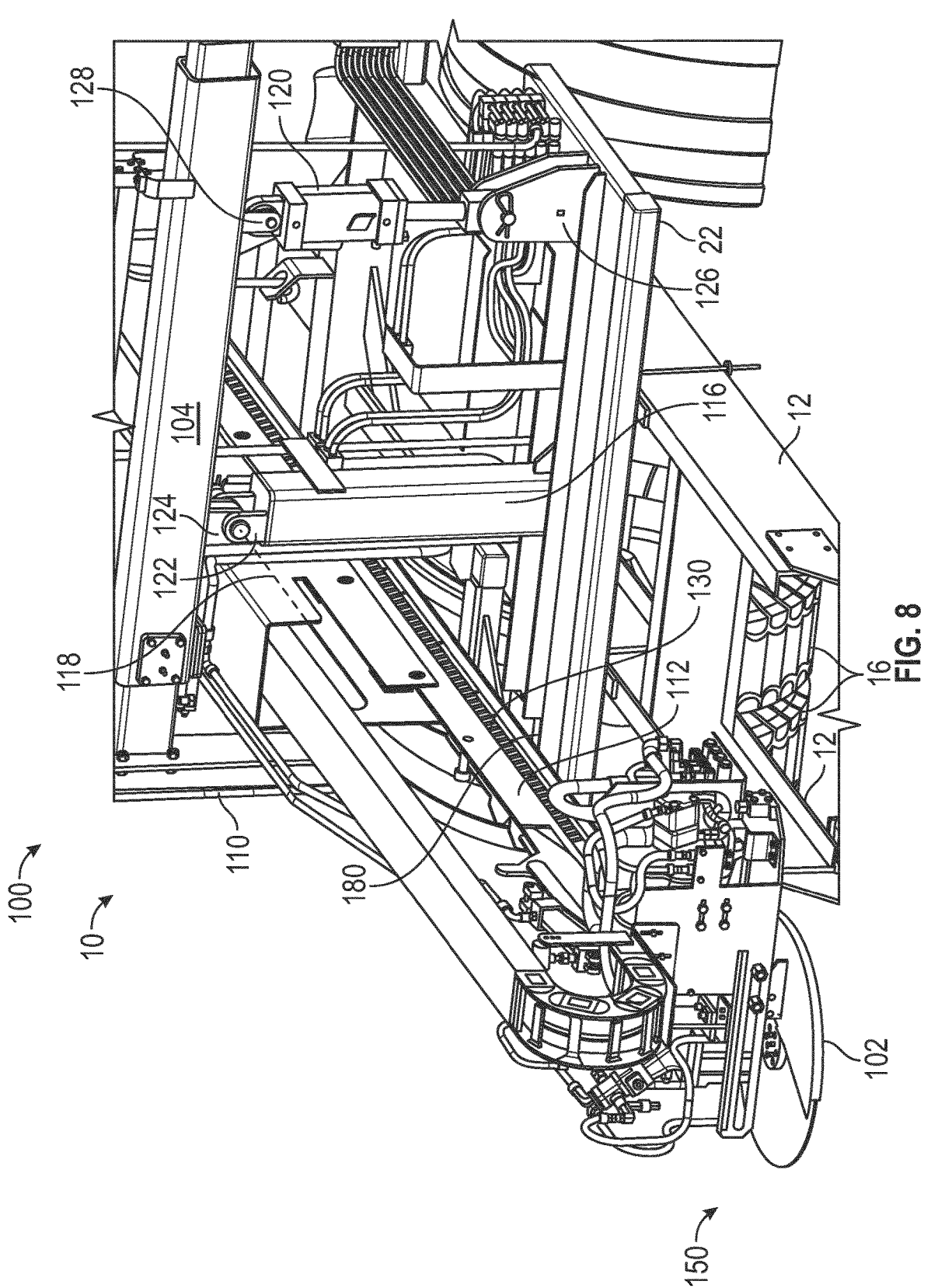
FIG. 8 is a rear perspective view of a portion of the curb cutting vehicle of FIG. 1, according to some embodiments.

Referring particularly to FIGS. 1-3, 8, and 10-11, the curb cutting assembly 100 includes vertical lift cylinders 102 (e.g., hydraulic cylinders, pneumatic cylinders, linear electric actuators, telescoping structural members including hydraulic cylinders that drive extension or retraction, etc.) that are configured to extend or retract to raise and lower the wing 112 and thereby the saw assembly 150 which is coupled on the wing 112. The vertical lift cylinders 102 may extend or retract along axes 108 that are substantially parallel with the vertical axis 26 to thereby translate the wing 112 and the saw assembly 150 in the upwards or downwards direction relative to the frame 12 of the vehicle 10. In some embodiments, when transitioning out of the transportation position as shown in FIG. 8, the vertical lift cylinders 102 are operated in order to translate the wing 112 upwards to thereby disengage the wing 112 from the groove recess 180 of the cradle assembly 22.

Referring particularly to FIGS. 1-3, 8, and 10-11, the curb cutting assembly 100 includes horizontal extension cylinders 104 (e.g., hydraulic cylinders, pneumatic cylinders, linear electric actuators, telescoping structural members including hydraulic cylinders that drive extension or retraction, etc.) that are configured to extend or retract to laterally offset the wing 112 relative to the frame 12 of the vehicle 10. In some embodiments, the horizontal extension cylinders 104 are configured to increase or decrease in length along axes 106 which are substantially parallel with the lateral axis 28. In some embodiments, the horizontal extension cylinders 104 are configured to extend or retract to move the saw assembly 150 in the horizontal direction. In some embodiments, when transitioning out of the transportation position, the vertical lift cylinders 102 are first operated to lift the wing 112 off of the cradle assembly 22, then the horizontal extension cylinders 104 are operated to laterally offset the wing 112, and then the vertical lift cylinders 102 are operated to lower the wing 112 downwards so that the wing 112 is on a lateral side of the vehicle 10. In some embodiments, a bottom end of the vertical lift cylinders 102 are fixedly coupled with the wing 112, and an upper end of the vertical lift cylinders 102 are fixedly coupled with an end of the horizontal extension cylinders 104.

Referring particularly to FIG. 8, the curb cutting assembly 100 includes a vertical support beam 116 (e.g., a portion of the cradle assembly 22, a vertically extending member, a post, a linkage, etc.) that includes a pivot member 122 (e.g., a pin joint, a rotatable joint, etc.) at an upper end of the vertical support beam 116. The vertical support beam 116 may be positioned at a lateral center of the cradle assembly 22 and the frame 12. The curb cutting assembly 100 can include at least two vertical support beams 116 positioned at different longitudinal positions below the horizontal extension cylinders 104. The horizontal extension cylinders 104 include a correspondingly positioned pivot member 124 that pivotally couples with the pivot member 122 of the vertical support beam 116 (e.g., through a pin, or a rotatable connector) so that the horizontal extension cylinders 104, and therefore the vertical lift cylinders 110, the wing 112, and the saw assembly 150 are configured to rotate about an axis 118 that is substantially parallel with the longitudinal axis 24. The vertical support beams 116 may be integrally formed or fixedly coupled with the cradle assembly 22 at a first end (e.g., a bottom end) and pivotally or rotatably coupled with the horizontal extension cylinders 104 at a second end. The curb cutting assembly 100 also includes a pivot cylinder 120 that is pivotally coupled at a first end with a pivot mount 126 of the cradle assembly 22, and pivotally coupled at a second end with a pivot mount 128 of the horizontal extension cylinders 104. The pivot cylinder 120 may extend or retract in order to drive the curb cutting assembly 100 (e.g., the horizontal extension cylinders 104, the vertical lift cylinders 110, the wing 112, and the saw assembly 150) to rotate or pivot about the axis 118 to thereby reposition the saw assembly 150. In some embodiments, the pivot mount 126, the pivot cylinder 120, and the pivot mount 128 are positioned at a same longitudinal position of the vertical support beam 116 (e.g., a same position along a length of the frame 12 or the cradle assembly 22) so that the pivot cylinder 120 can operate to drive the saw assembly 150 and wing 112 to rotate about the axis 118.

Referring to FIGS. 5, 11-12, and 14, the saw assembly 150 is supported by the wing 112 and is configured to transport along the wing 112 in either direction. For example, the saw assembly 150 may transport, walk along, translate along, etc., the wing 112. In some embodiments, the wing 112 includes a lip, a protrusion, an edge, etc. shown as edge 136, along a length of the wing 112 that is configured to support the saw assembly 150. The saw assembly 150 may be configured to translate along the wing 112 in either a first direction 132 towards a front of the wing 112 and the vehicle 10, or in a second direction 134 towards a rear of the wing 112 and the vehicle 10 in order to perform a cutting operation of the curb 302. The saw assembly 150 includes a corresponding hook 152 that is configured to engage the edge 136 of the wing 112 to thereby couple the saw assembly 150 with the wing 112.

Figure 12:
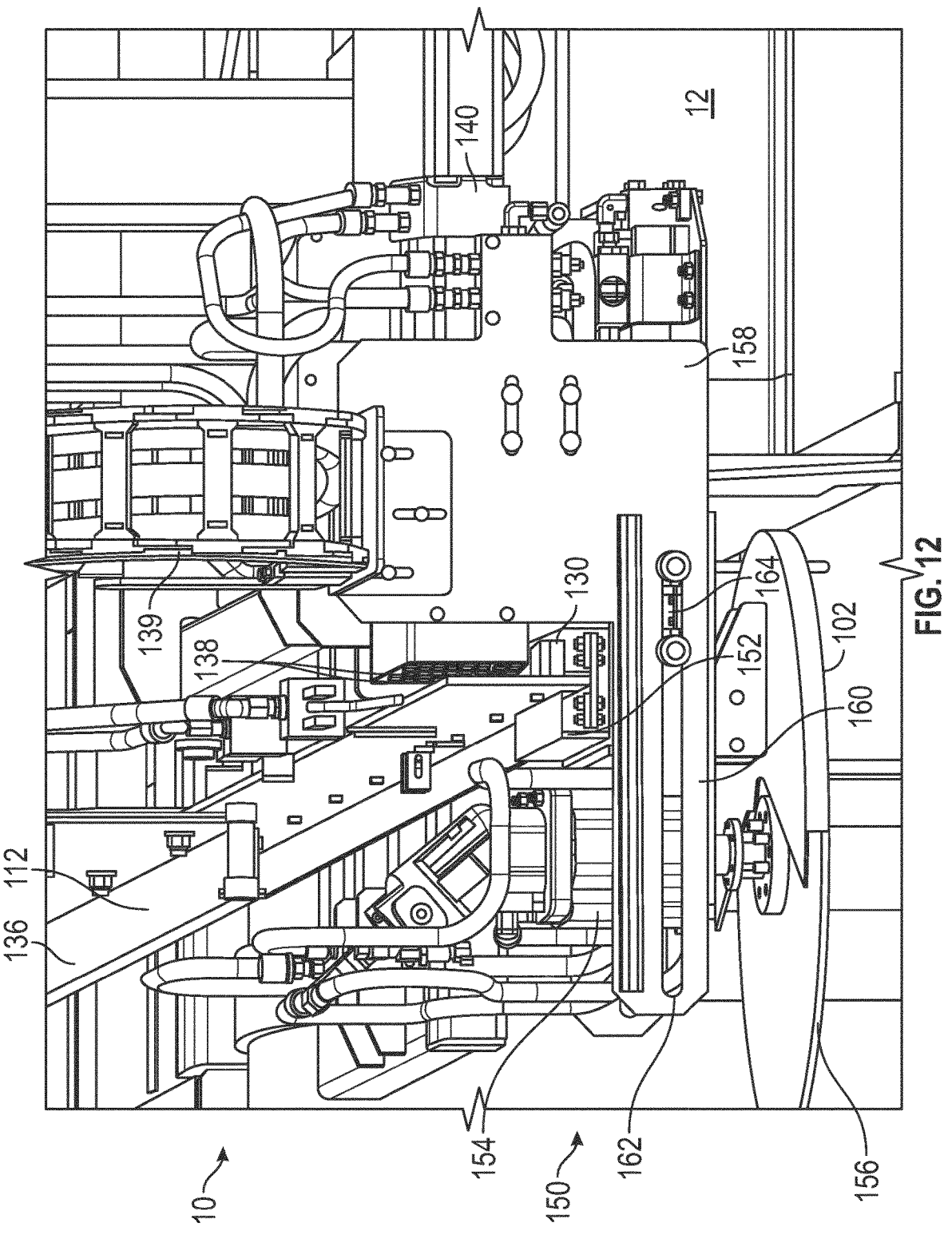
FIG. 12 is a perspective view of the saw assembly of FIG. 5, according to some embodiments.
Figure 14:
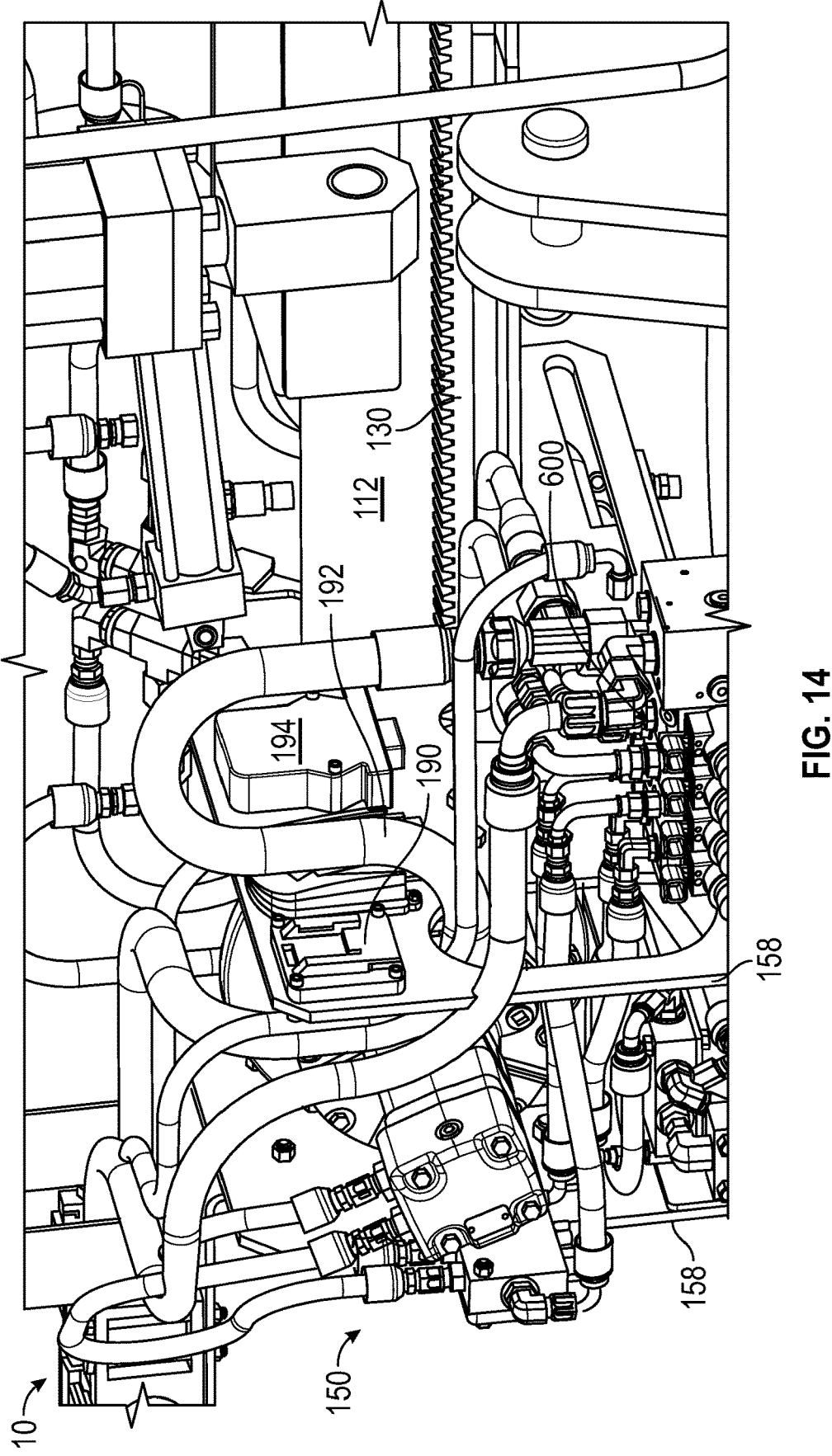
FIG. 14 is a perspective view of a rear portion of the saw assembly of FIG. 5, according to some embodiments.

Referring particularly to FIGS. 8, 12, and 14, the wing 112 includes a rack 130 along an entire length of the wing 112. The rack 130 is fixedly coupled on a rear of the wing 112 and includes one or more teeth. The saw assembly 150 includes a carriage 158 that is configured to support various components of the saw assembly 150. In particular, the hook 152 may be fixedly coupled or integrally formed with the carriage 158 and is configured to couple with the edge 136 of the wing 112. The carriage 158 is also configured to support a pinion motor 140 (e.g., a second hydraulic motor) of the saw assembly 150. The pinion motor 140 may be a hydraulic motor that is configured to receive hydraulic fluid through one or more hoses or hydraulic lines that are routed through a hose guide 139.

In some embodiments, the carriage 158 is configured to support and rotatably couple with one or more gears or pinions 138 (e.g., pinion gears). The pinions 138 are configured to couple with teeth of the rack 130. The pinions 138 are configured to be driven by the pinion motor 140 which may operate to drive the pinions 138 in either direction to thereby drive the carriage 158 (e.g., the saw assembly 150) along the wing 112 in either the first direction 132 or the second direction 134 (e.g., depending on a direction of rotation of the pinion motor 140). In this way, the saw assembly 150 can be transported along the wing 112 in either direction (e.g., along a length of the wing 112) to cut the curb 302.

Figure 6:
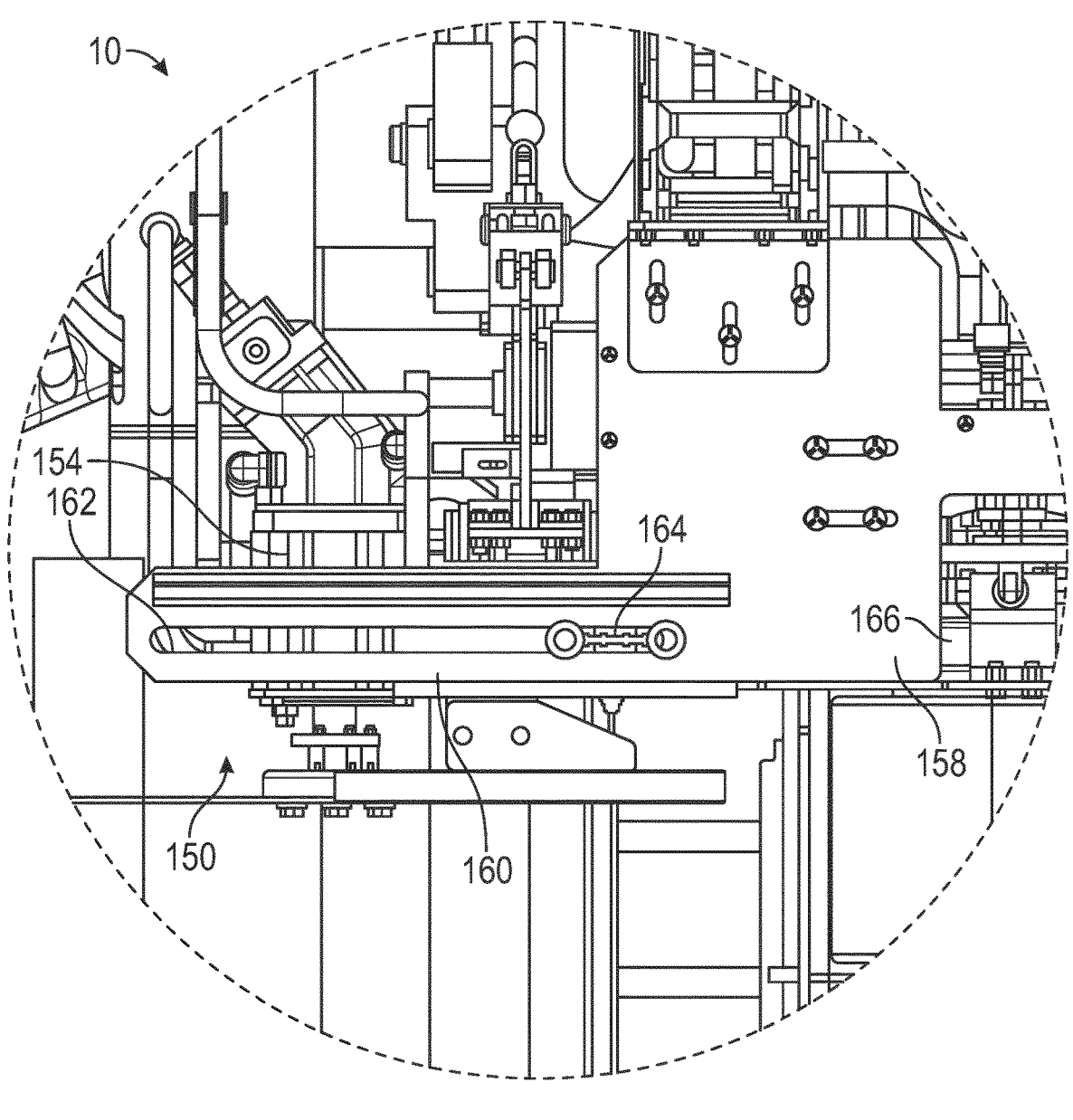
FIG. 6 is a side view of the saw assembly of FIG. 5, according to some embodiments.
Figure 13:
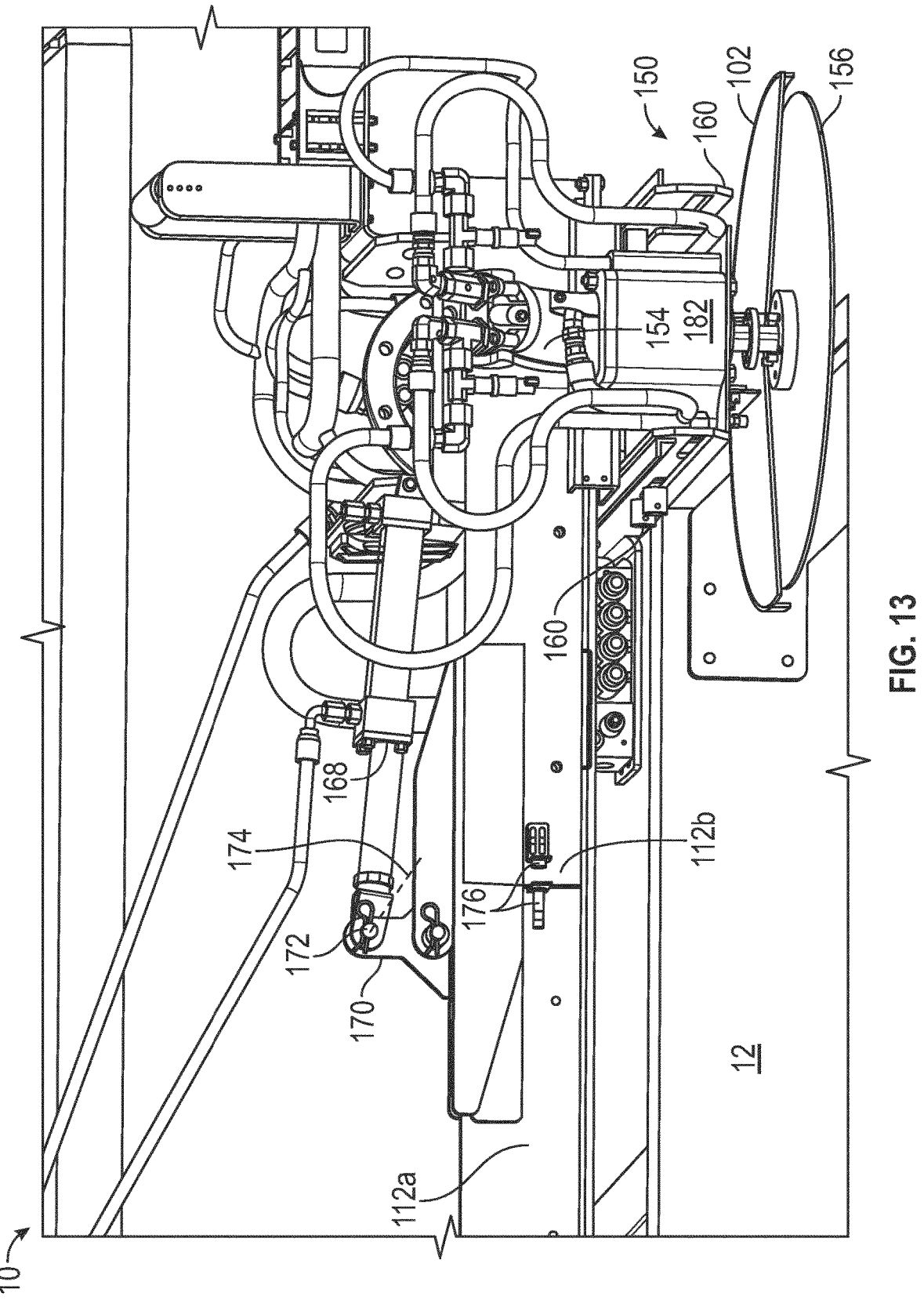
FIG. 13 is a perspective view of the saw assembly of FIG. 5, according to some embodiments.

Referring to FIGS. 6 and 12-13, the carriage 158 includes a pair of elongated members 160 (e.g., bars, cantilever beams, cantilevered channels, structural components having a fixed end and a free end, etc.). The elongated members 160 extend laterally outwards from a main or body portion of the carriage 158. In some embodiments, the elongated members 160 extend laterally outwards relative to the frame 12 of the vehicle 10. The elongated members 160 each include a slot 162 (e.g., an opening, an aperture, a channel, a slotted track, etc.) that is configured to receive a follower 164. The follower 164 is fixedly coupled with a saw body 182 (e.g., a gear box) of a saw 103. The saw 103 also includes a saw motor 154 (e.g., a first hydraulic motor) that is coupled with the saw body 182. The saw motor 154 is configured to drive a saw blade 156 of the saw 103. The saw 103 may be translatable along the slot 162 in order to extend the saw blade 156 for cutting the curb 302. The saw assembly 150 also includes a saw cylinder 166 (e.g., a saw extension cylinder, an actuator, etc.) that is configured to extend or retract to translate the saw 103 back and forth along the slot 162 to perform a cut of the curb 302 (e.g., to adjust a depth of the cut of the curb 302). In some embodiments, the saw cylinder 166 is operated to adjust depth of the cut as the saw assembly 150 transports along the wing 112 when the curb 302 is curved (e.g., a curved street curb that increases or decreases in lateral distance relative to a side of the vehicle 10 along the length of the wing 112) to ensure that the curb 302 is cut fully.

Figure 4:
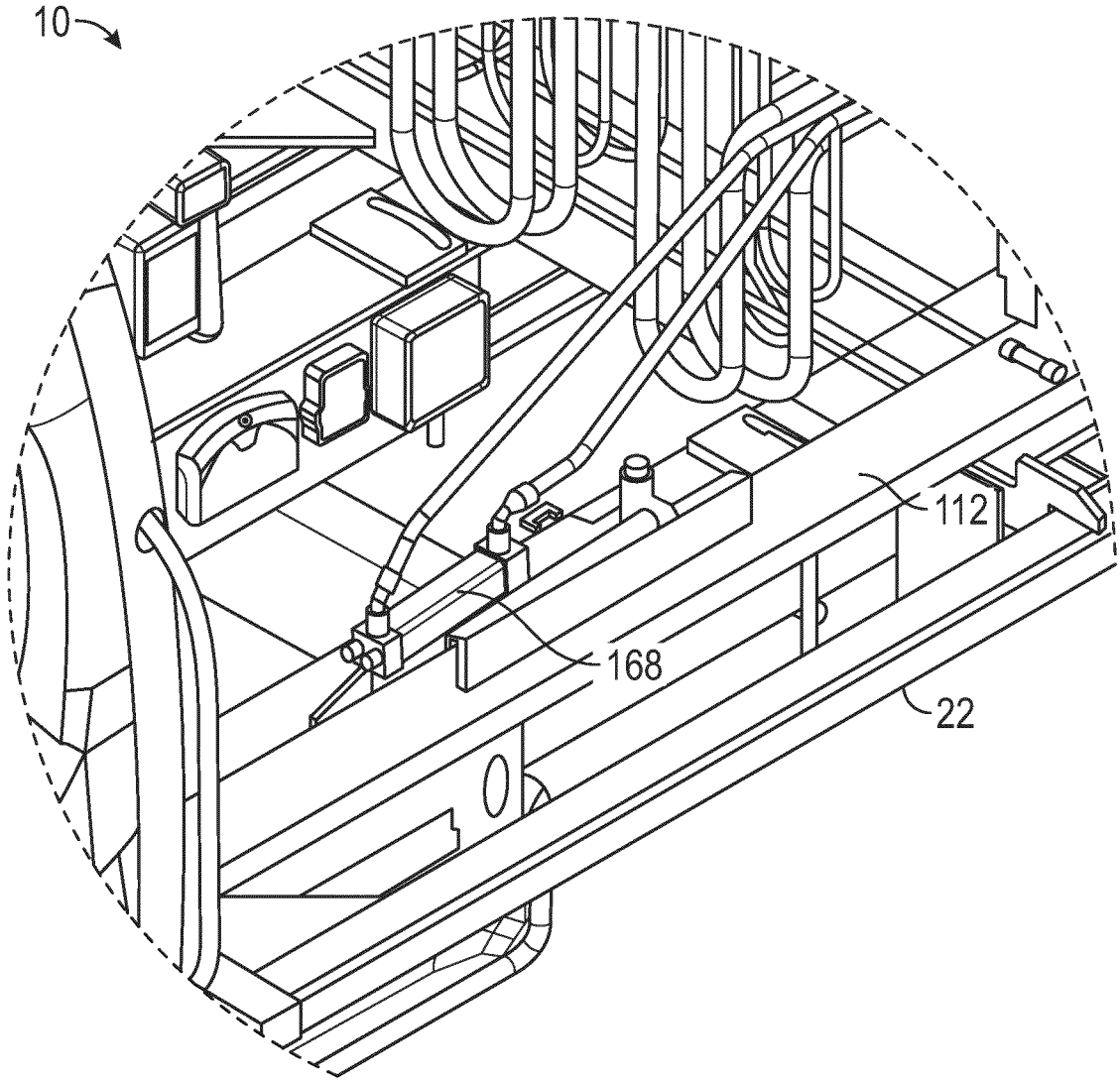
FIG. 4 is a perspective view of a wing cylinder of the curb cutting vehicle of FIG. 1, according to some embodiments.
Figure 5:
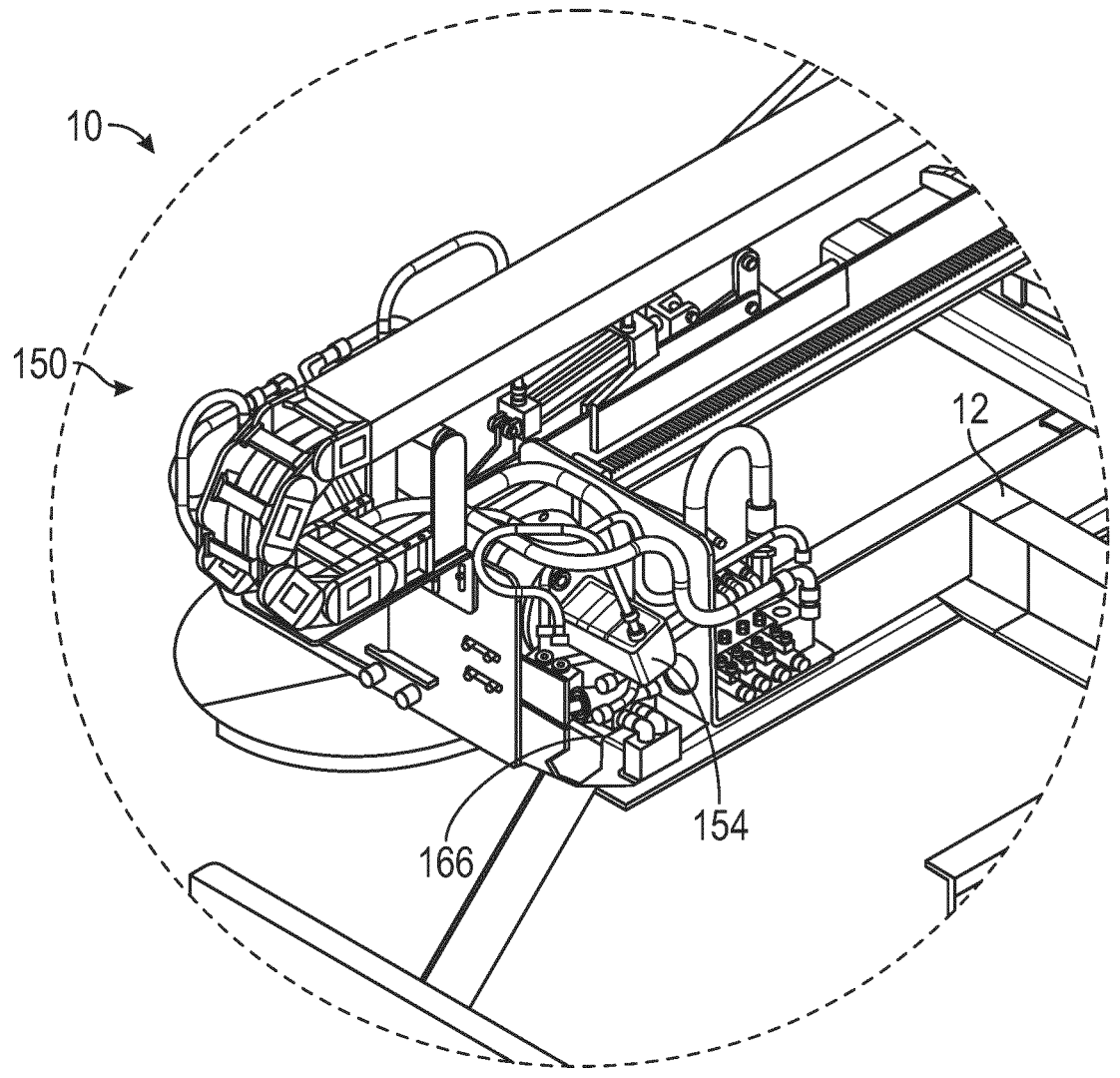
FIG. 5 is a perspective view of a saw assembly of the curb cutting vehicle of FIG. 1, according to some embodiments.

Referring to FIG. 13, the wing 112 includes a first wing section 112a (e.g., a medial section) and a second wing section 112b (e.g., an end portion). The wing 112 may also include another wing section (e.g., another end portion) similar to the second wing section 112b at an opposite end of the first wing section 112a. The second wing section 112b is pivotally coupled with the first wing section 112a so that the second wing section 112b can rotate to change an angle of the saw assembly 150 relative to the lateral axis 28 or relative to a lateral direction of the vehicle 10. In some embodiments, the first wing section 112a includes a pivot mount 170 that defines a pivot point 172. The pivot point 172 may define an axis 174. The axis 174 may be parallel with the lateral axis 28 when the wing 112 is not pivoted about the axis 118 by operation of the pivot cylinder 120. The wing 112 includes a wing cylinder 168 that is pivotally coupled at a first end with the pivot mount 170 (e.g., at the pivot point 172) of the first wing section 112a and at an opposite end with a corresponding pivot mount of the second wing section 112b. The wing cylinder 168 may retract or extend to rotate the second wing section 112b relative to the first wing section 112a when the saw assembly 150 is currently positioned along the second wing section 112b. In some embodiments, rotating the second wing section 112b relative to the first wing section 112a results in the saw assembly 150 being rotated about the axis 174 so that the saw 103 can perform an angled cut of the curb 302. In some embodiments, the saw assembly 150 is configured to transport along the second wing section 112b when the second wing section 112b is rotated relative to the first wing section 112a. The wing 112 may similarly include a third wing section at an opposite end, and another wing cylinder 168 and pivotal coupling between the first wing section 112a and the third wing section (e.g., as shown in FIG. 4).

Referring still to FIG. 13, the wing 112 includes a sensor 176 that includes portions coupled with the first wing section 112a and the second wing section 112b. When the first wing section 112a and the second wing section 112b are aligned as shown in FIG. 13, readings from the sensor 176 indicate alignment (e.g., due to proximity of the portions of the sensor 176). When the first wing section 112a and the second wing section 112b are not aligned, readings from the sensor 176 may indicate that the second wing section 112b is rotated relative to the first wing section 112a.

Figure 9:
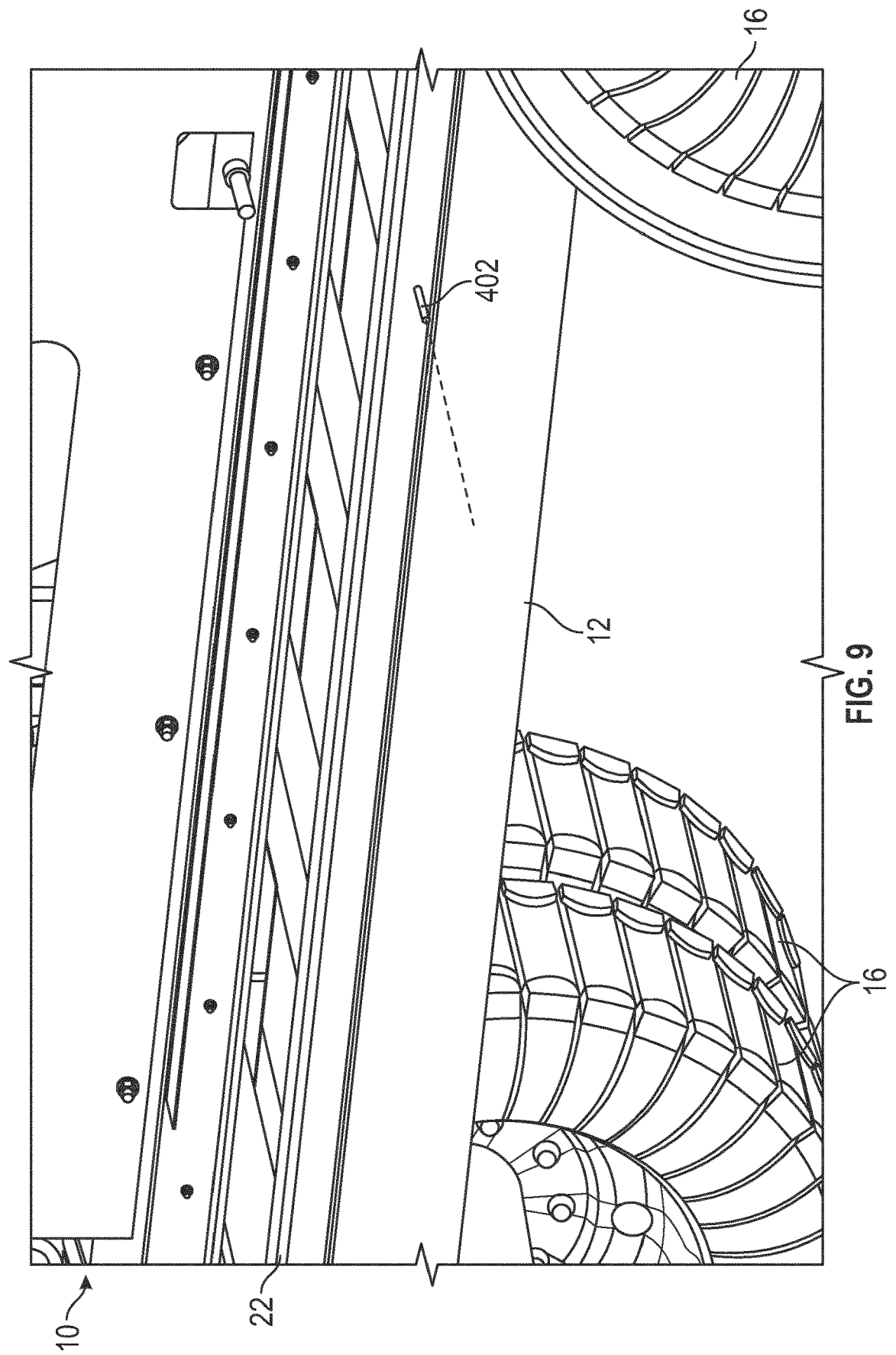
FIG. 9 is a perspective view of a portion of the curb cutting vehicle of FIG. 1, according to some embodiments.
Figure 10:
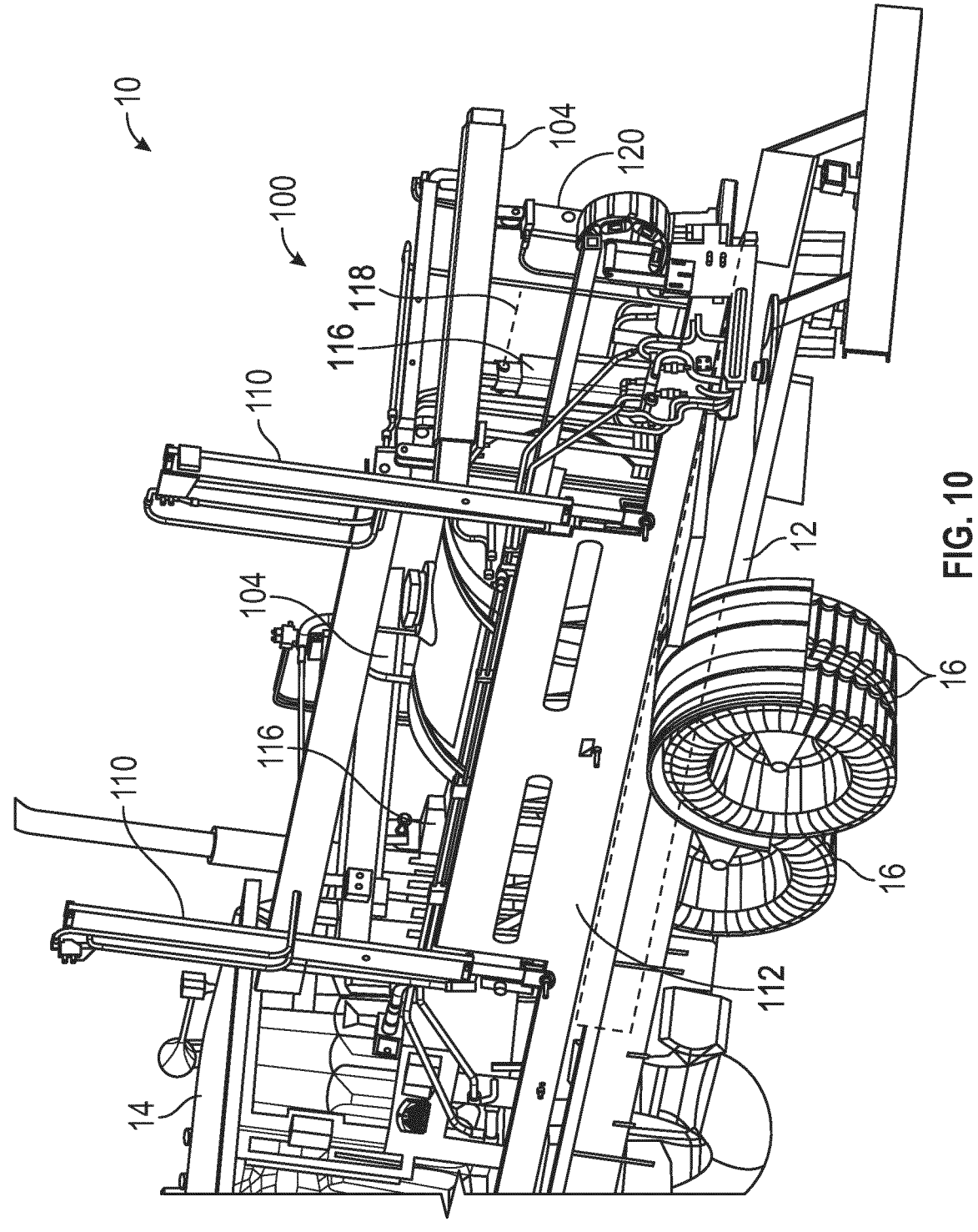
FIG. 10 is a perspective view of a rear portion of the curb cutting vehicle of FIG. 1, according to some embodiments.
Figure 11:
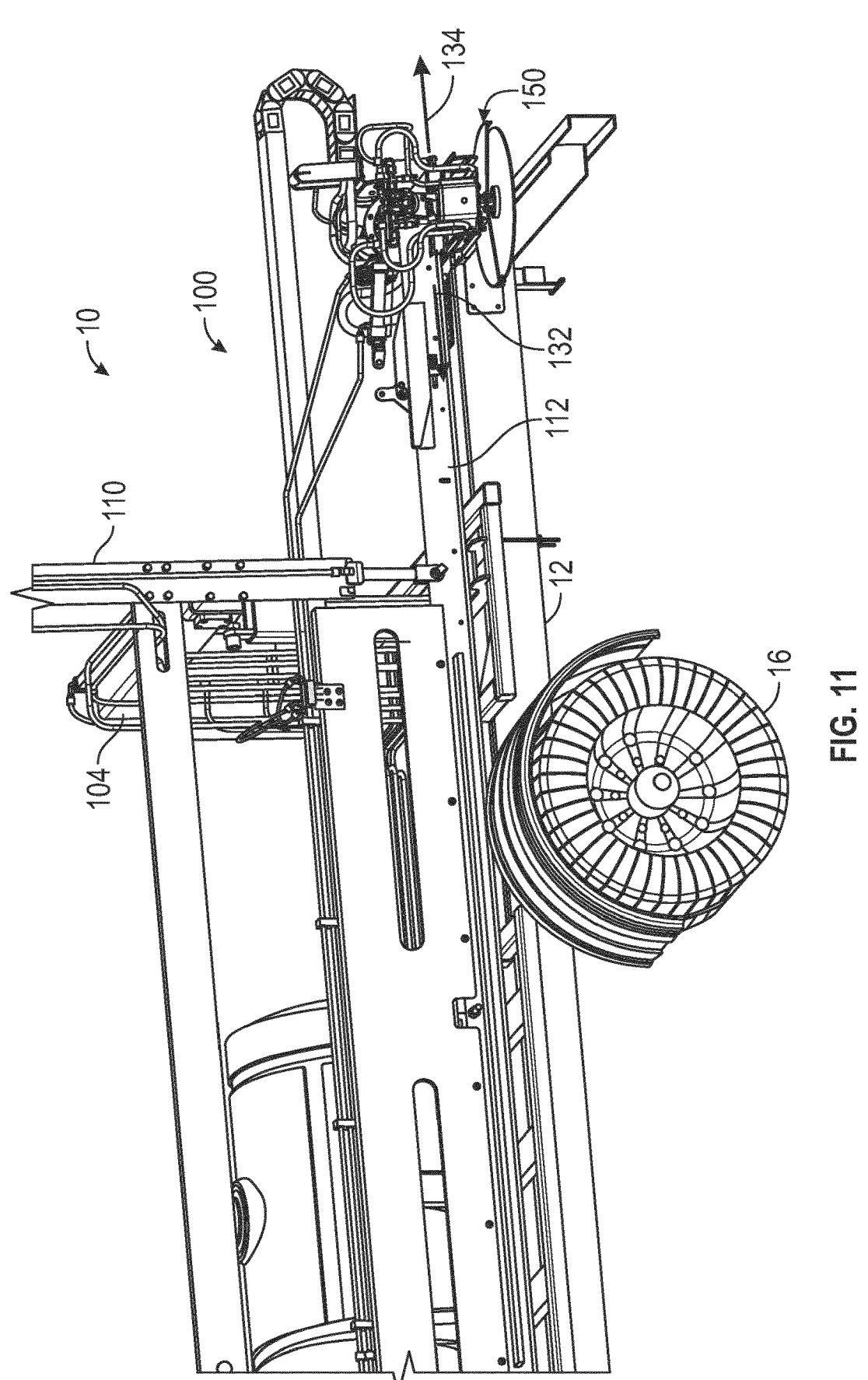
FIG. 11 is a perspective view of a rear portion of the curb cutting vehicle of FIG. 1, according to some embodiments.

Referring to FIG. 9, the cradle assembly 22 (or alternatively the frame 12) includes an extendable member 402 that can be extended (e.g., manually) from the cradle assembly 22. The extendable member 402 may be extended to function as a ruler or a measurement device in order to indicate if the vehicle 10 is at an appropriate distance from the curb 302 (e.g., a lateral distance).

Figure 2:
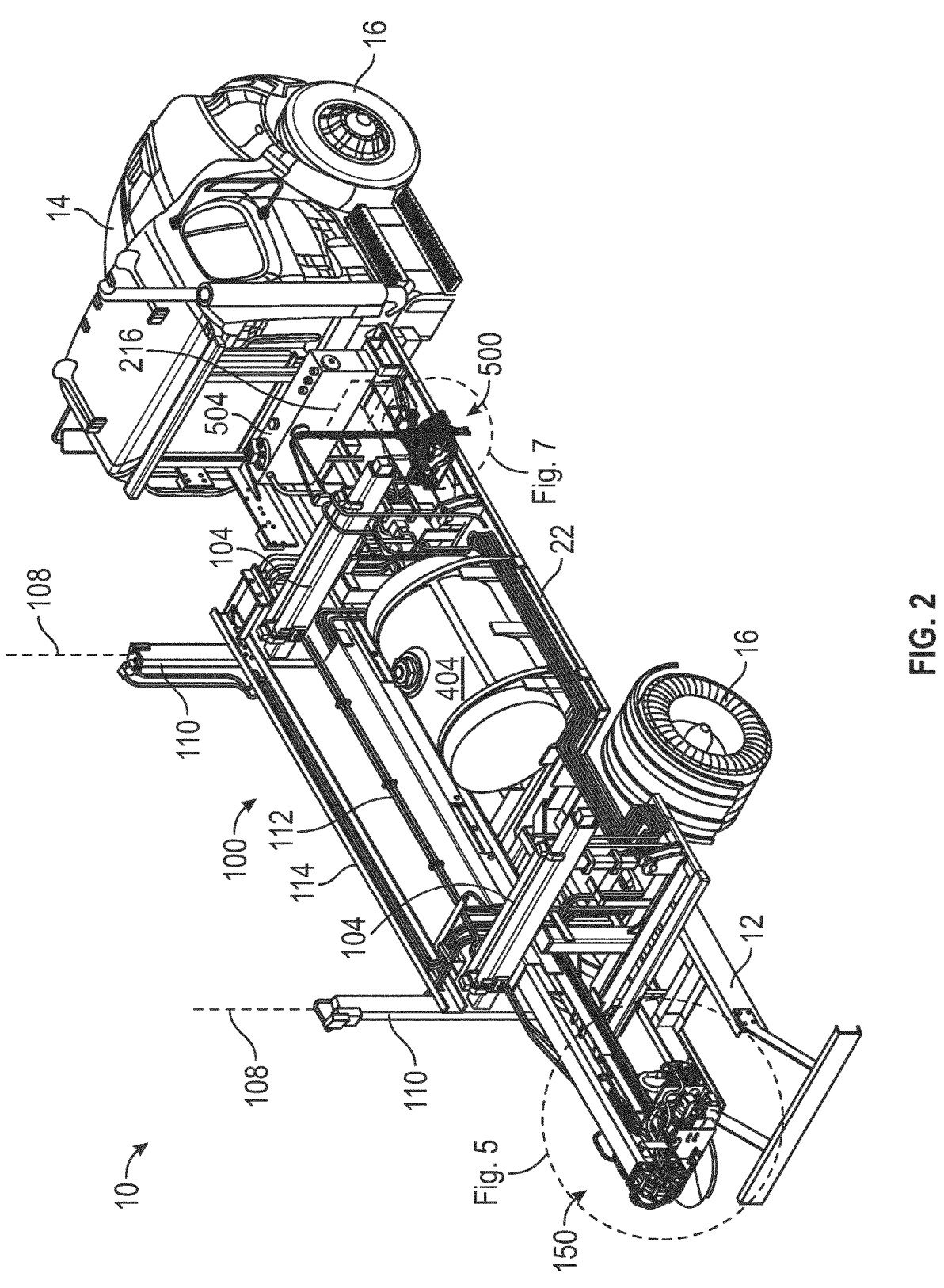
FIG. 2 is another perspective view of the curb cutting vehicle of FIG. 1, according to some embodiments.
Figure 3:
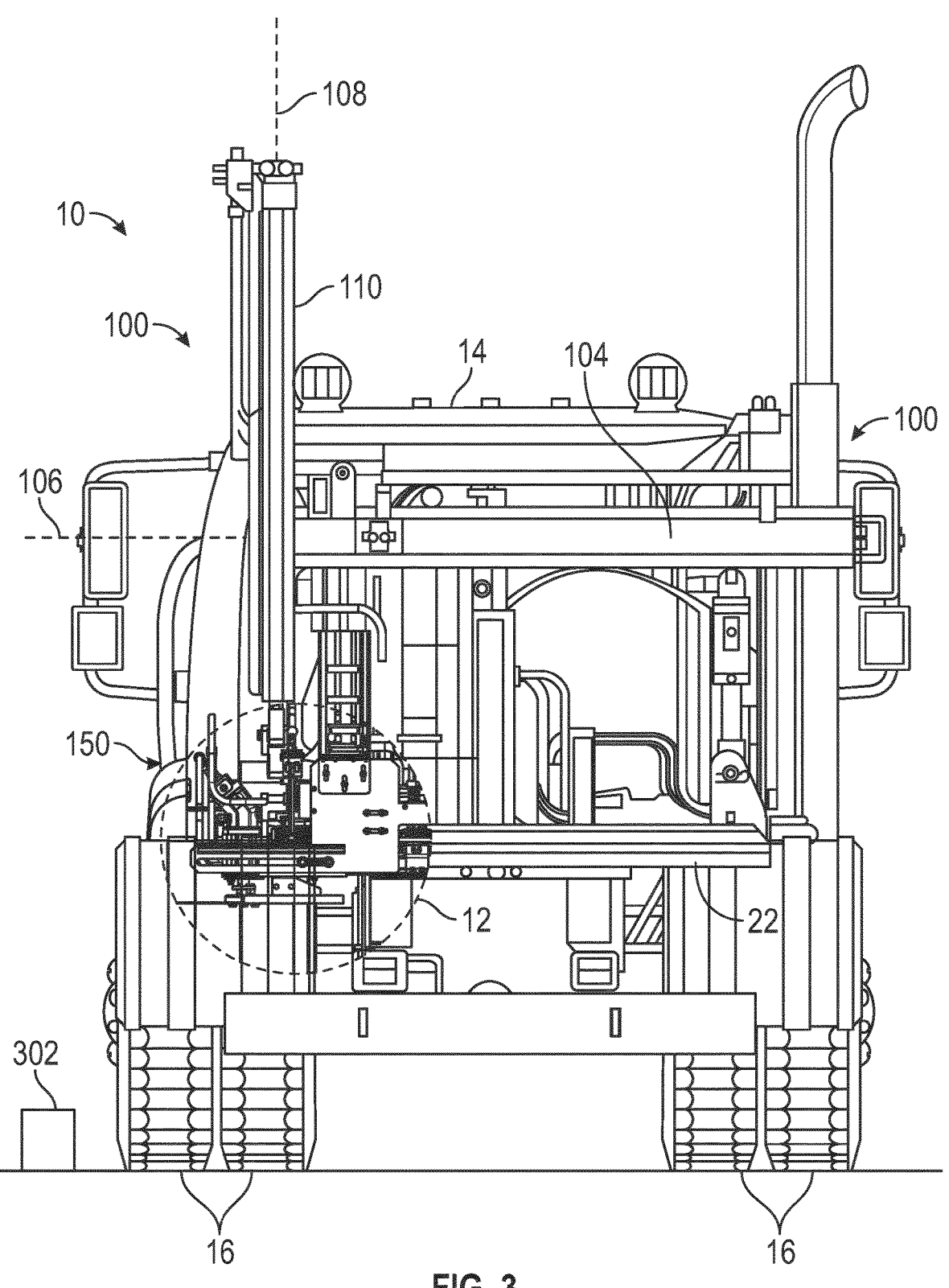
FIG. 3 is a rear view of the curb cutting vehicle of FIG. 1, according to some embodiments.
Figure 7:
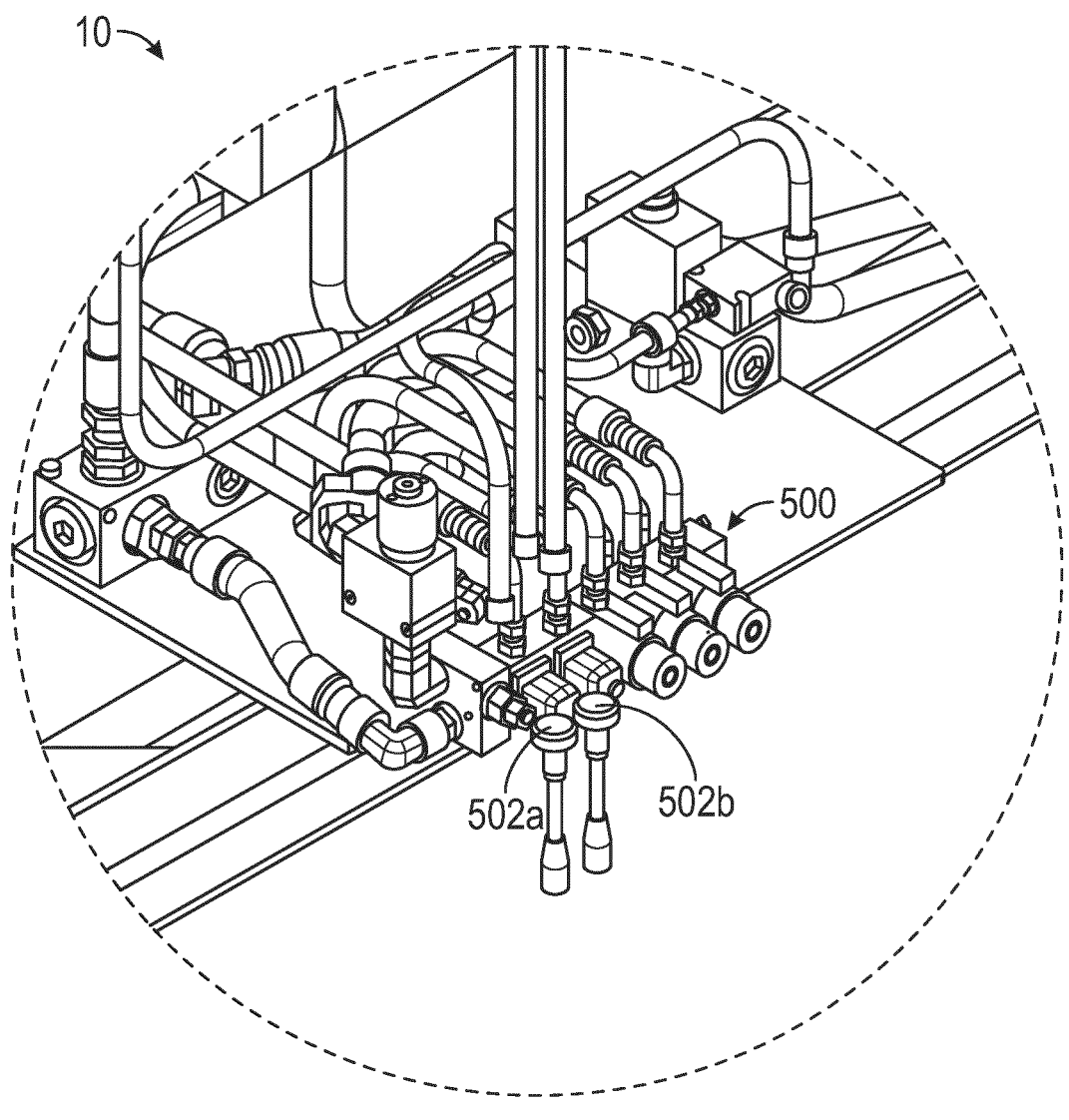
FIG. 7 is a perspective view of a valve bank of the curb cutting vehicle of FIG. 1, according to some embodiments.

Referring to FIGS. 2 and 7, a frame mounted valve bank 500 is configured to receive hydraulic fluid from a reservoir 504 (e.g., a tank, a canister, etc.) and deliver hydraulic fluid to different cylinders or hydraulic devices of the vehicle 10 or the curb cutting assembly 100. The frame mounted valve bank 500 includes a first lever 502a and a second lever 502b. The first lever 502a is operable to control extension or retraction of the horizontal extension cylinders 104 (e.g., by adjusting an inflow and/or rate of hydraulic fluid into one or more chambers of the horizontal extension cylinders 104). The second lever 502b is operable to control extension or retraction of the pivot cylinders 120 (e.g., by adjusting an inflow and/or rate of hydraulic fluid into one or more chambers of the pivot cylinders). In some embodiments, the curb cutting assembly 100 includes an inclinometer (e.g., an analog or fluidic based orientation sensor) positioned at the frame mounted valve bank 500 for displaying a current orientation or pitch of the curb cutting assembly 100 (e.g., a current pitch of the horizontal extension cylinders 104).

Referring to FIG. 14, the curb cutting assembly 100 also includes a second valve bank 600 that is coupled on the carriage 158. The second valve bank 600 may include multiple valves that are configured to control a flow of hydraulic fluid and/or a rate of the hydraulic fluid to the various components of the saw assembly 150 or the wing 112, such as the saw cylinder 166, the saw motor 154, the pinion motor 140, and the wing cylinders 168. In some embodiments, the second valve bank 600 is also configured to direct water through pipes, lines, conduits, etc., to one or more nozzles of the saw assembly 150 to spray the water onto the saw blade 156 when cutting the curb 302.

Referring still to FIG. 14, the curb cutting assembly 100 also includes a battery receiver 190 configured to electrically and physically couple with a removable battery, a transceiver controller 192, and a radio transceiver 194 (e.g., the wireless transceiver 210). In some embodiments, the radio transceiver 192 is configured to receive or facilitate communications between the controller 192 and a remote control for operating the curb cutting assembly 100. In some embodiments, the transceiver controller 192 communicates with a main controller of the curb cutting assembly (e.g., the controller 202) wirelessly.

Hydraulic System

Figure 19:
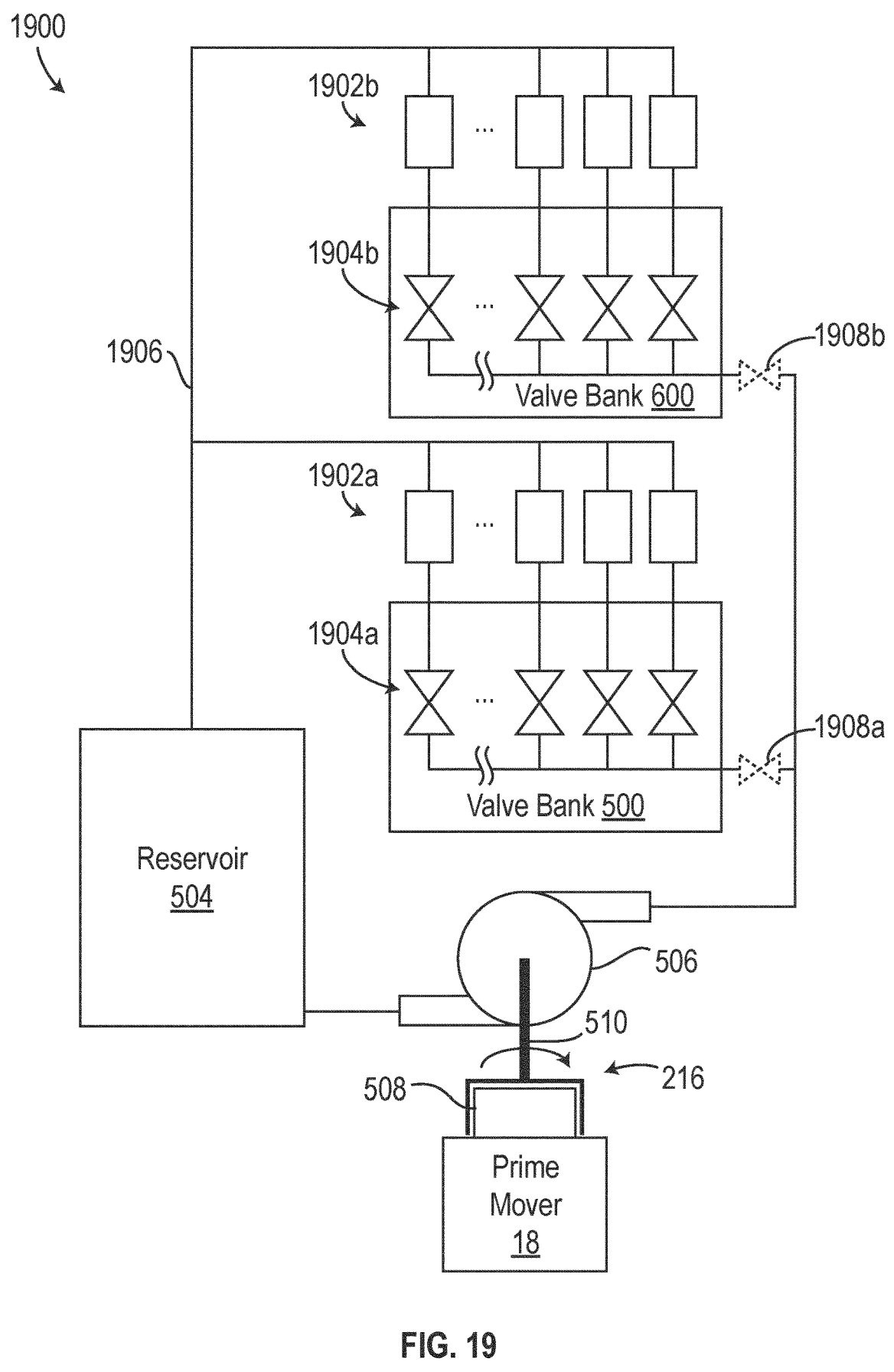

Referring to FIG. 19, a diagram of a hydraulic system 1900 illustrates various components of hydraulic systems of the vehicle 10 and the curb cutting assembly 100, according to some embodiments. The hydraulic system 1900 includes a pump 506, the PTO 216, hydraulic lines 1906, the reservoir 504, the valve bank 500, the valve bank 600, one or more hydraulic devices 1902a and corresponding valves 1904a of the valve bank 500, and one or more hydraulic devices 1902b and corresponding valves 1904b of the valve bank 600. The PTO 216 includes a clutch 508 and a driveshaft 510. When the PTO 216 is activated, the clutch 508 is engaged (e.g., transitioned into an engaged state) so that the driveshaft 510 is driven by the prime mover 18. The pump 506 is driven by the prime mover 18 through the driveshaft 510 and the clutch 508 and pressurizes hydraulic fluid provided by the reservoir 504. The clutch 508 may be transitionable into a disengaged state to rotationally decouple the prime mover 18 from the pump 506. The pump 506 provides hydraulic fluid to the valve bank 500 and the valve bank 600 through the hydraulic lines 1906. The valves 1904a of the valve bank 500 and the valves 1904b of the valve bank 500 may be pressure compensated valves, flow control valves, pressure relief valves, etc. In some embodiments, each of the valves 1904 are configured to control a flow of hydraulic fluid to the corresponding hydraulic device 1902. For example, the valves 1904 may redirect fluid between different chambers of the hydraulic devices 1902 (e.g., hydraulic cylinders) in order to operate extension or retraction of the hydraulic cylinders at a desired rate. In some embodiments, one or more of the valves 1904a of the valve bank 500 or the valves 1904b of the valve bank 500 are manually operable (e.g., by operating levers). In some embodiments, one or more of the valves 1904a of the valve bank 500 or the valves 1904b of the valve bank 600 are electrically operable (e.g., by a controller, by a remote control, etc.). In some embodiments, the hydraulic devices 1902a include any of the vertical cylinders 110, the horizontal cylinders 104, the hinge cylinders 120, etc., or any other cylinders of the curb cutting assembly 100. In some embodiments, the hydraulic devices 1902b include any hydraulic devices of the wing 112 including, but not limited to, the extension cylinder 166, the saw motor 140, the wing cylinders 168, etc. The hydraulic system 1900 may optionally include valves 1908a and 1908b that control fluidic input to the valve bank 500 and the valve bank 600, respectively. The valves 1908a and/or 1908b may be, by default, in a closed position, and may fail in a closed position to improve safety measures. In some embodiments, the valves 1908a and 1908b are electrically actuatable and are configured to receive a control signal from the controller 202 to transition out of the closed position into an open position.

Modular Power Unit

Figure 15:
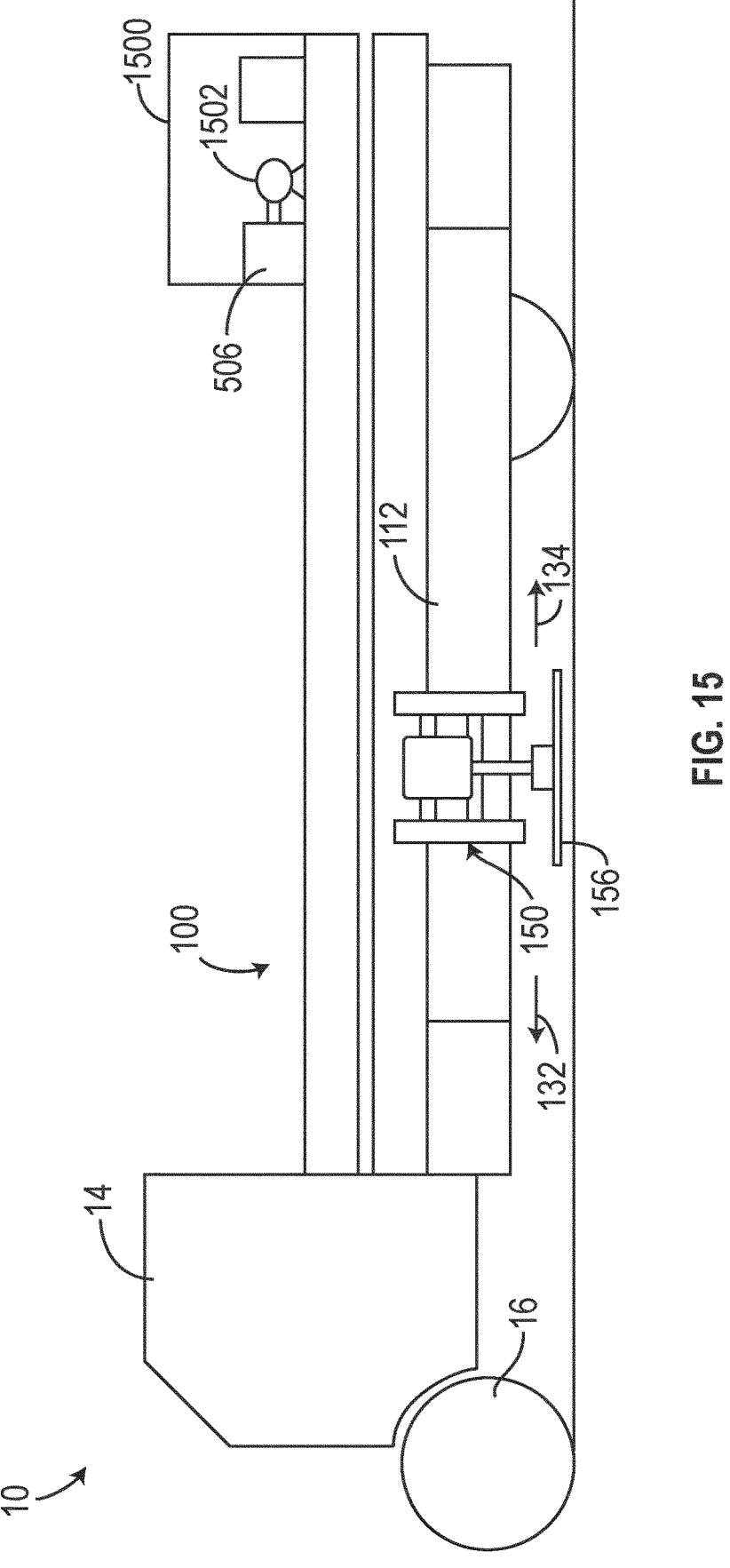
FIG. 15 is a side view of the curb cutting vehicle of FIG. 1 including a separate power take off unit, according to some embodiments.
Figure 16:
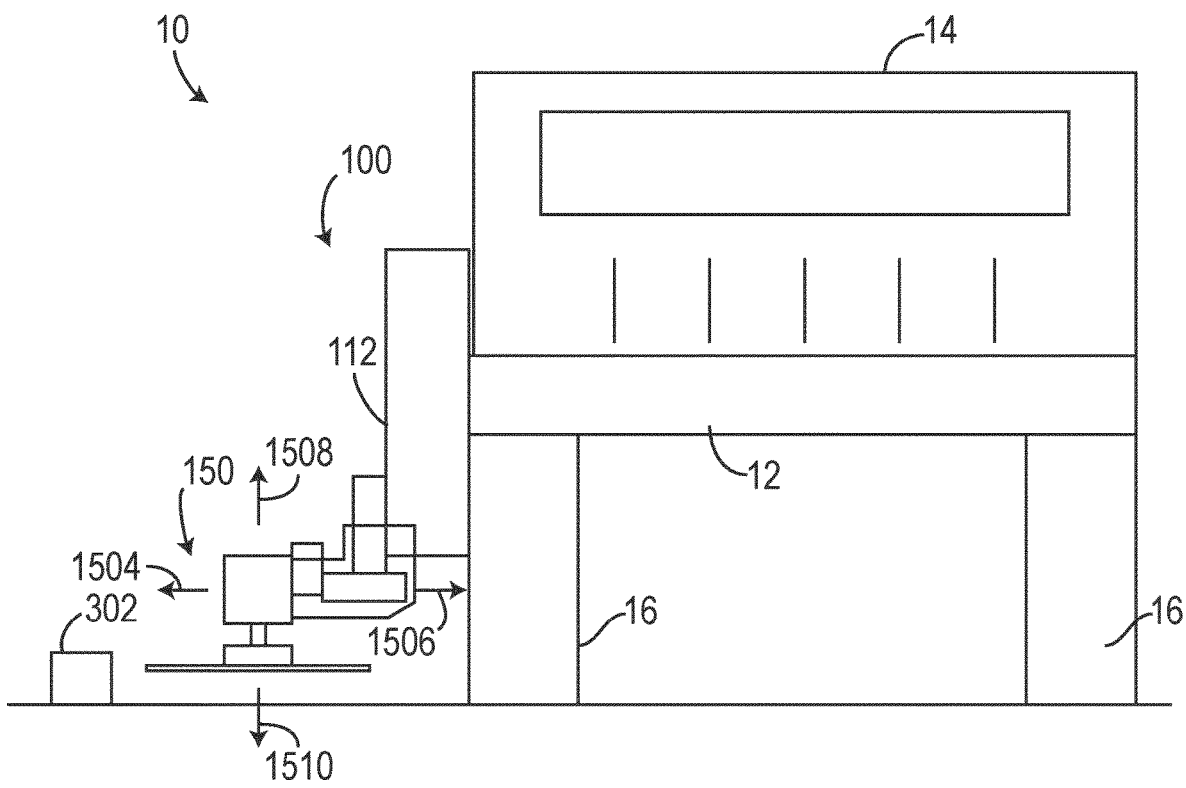
FIG. 16 is a rear view of the curb cutting vehicle of FIG. 15, according to some embodiments.

Referring to FIGS. 15-16, the vehicle 10 is shown with the curb cutting assembly 100 and a modular power unit 1500. As shown in FIGS. 15-16, the saw assembly 150 may transport along the wing 112 in either the first direction 132, or the second direction 134 due to operation of the pinion motor 140. The saw assembly 150, or more specifically, the saw 103 may translate in an outwards direction 1504 (e.g., to plunge into the curb 302) or in an inwards direction 1506 (e.g., to be removed from the curb 302, or to plunge into a curb that is positioned between the saw 103 and the side of the vehicle 10) due to operation of the saw cylinder 166. The saw assembly 150 may also be configured to translate in an upwards direction 1508 or a downwards direction 1510 due to operation of the vertical cylinder 110. In some embodiments, the saw assembly 150 is cable driven to transport along the wing 112. In some embodiments, the saw assembly 150 is driven by an actuator (e.g., a hydraulic actuator, a linear electric actuator, etc.) to transport along the wing 112. In some embodiments, the saw assembly 150 is driven to transport along the wing 112 by an electric motor in place of the pinion motor 140. In some embodiments, any of the hydraulic components described herein (e.g., the vertical cylinders 110, the horizontal cylinders 104, the pivot cylinders 120, the saw cylinder 166, the saw motor 154, the pinion motor 140, the wing cylinders 168, etc.) are replaced or replaceable with an electric actuator or electric motor.

The power unit 1500 may include a diesel motor 1502 that consumes fuel from a fuel tank (e.g., a reservoir) and powers the pump 506 to pressurize the hydraulic fluid for operation of the curb cutting assembly 100. In this way, the curb cutting assembly 100 can be powered and operated independently of operation of the prime mover 18 (e.g., when the prime mover 18 is shut off, or regardless of operational status of the prime mover 18).

Trailer Mounted Curb Cutter

Figure 20:
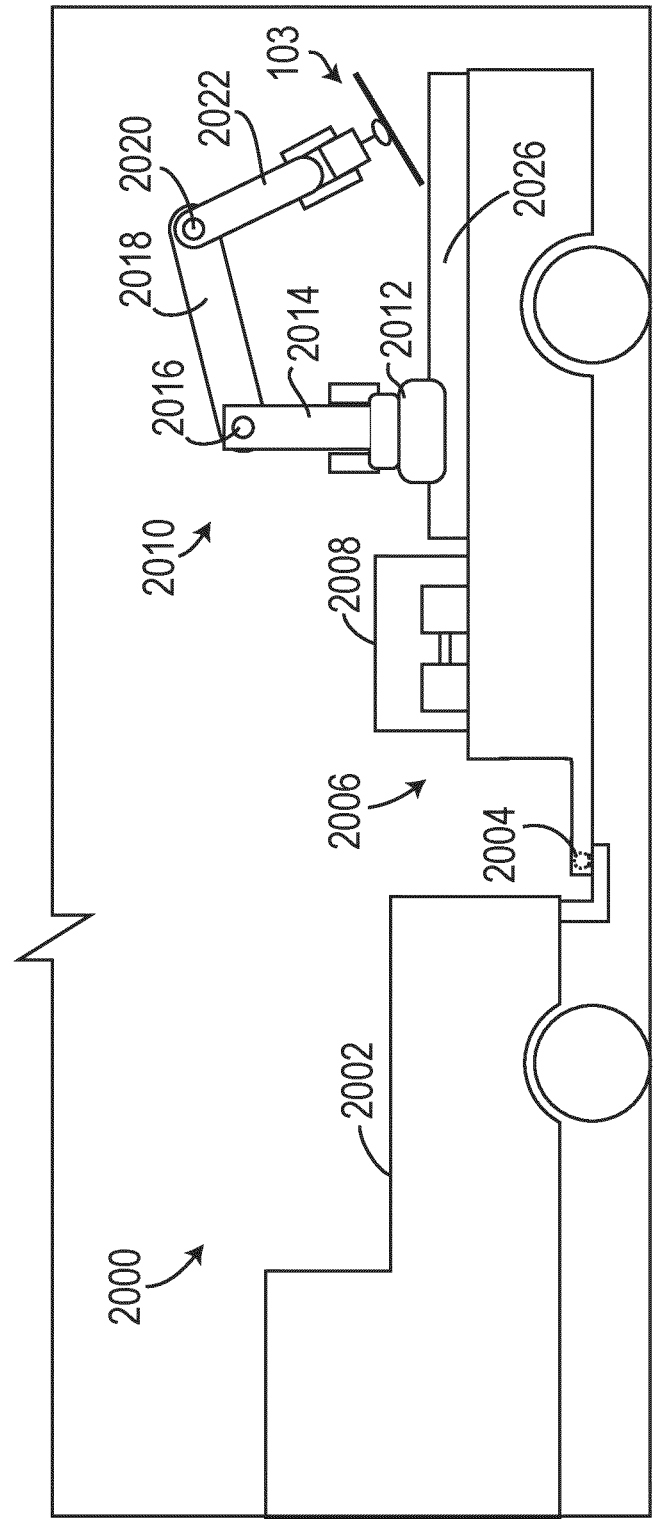
FIG. 20 is a side view of a curb cutting assembly implemented on a trailer that can be towed by a truck, according to some embodiments.

Referring to FIG. 20, a curb cutting system 2000 may include a trailer mounted curb cutting assembly 2010 mounted to a trailer 2006 and towed behind a vehicle 2002 (e.g., a truck) through a tow hitch 2004. The curb cutting assembly 2010 may include multiple linkages or elongated members, shown as member 2014, member 2018, and member 2022. In some embodiments, the member 2014 is pivotally or rotatably coupled with the trailer 2006 through a carriage 2012. The carriage 2012 may be configured to translate along a linear travel rail 2026, similarly to the wing 112 as described in greater detail above. The member 2018 is rotatably coupled with the member 2014 through a pivotal coupling 2016. The member 2022 is rotatably coupled with the member 2018 through a pivotal coupling 2020. The saw 103 is mounted (e.g., rotatably, pivotally, hingedly in multiple direction, etc.) with the member 2022 at an end of the member 2022. In some embodiments, one or more of the members 2014, 2018, or 2022 are telescoping members. In some embodiments, the curb cutting assembly 2010 is an articulated boom arm assembly. In some embodiments, the trailer 2006 includes a power unit 2008 that includes a diesel engine or other internal combustion engine configured to consume fuel and drive a hydraulic pump to pressurize hydraulic fluid for one or more hydraulic cylinders of the curb cutting assembly 2010, and for one or more hydraulic motors (e.g., of the saw 103). In some embodiments, one or more hydraulic components of the curb cutting assembly 100 or the curb cutting assembly 2010 are replaced with electrical devices and the power unit 2008 includes batteries for storing and discharging electrical power.

Control System

Figure 17:
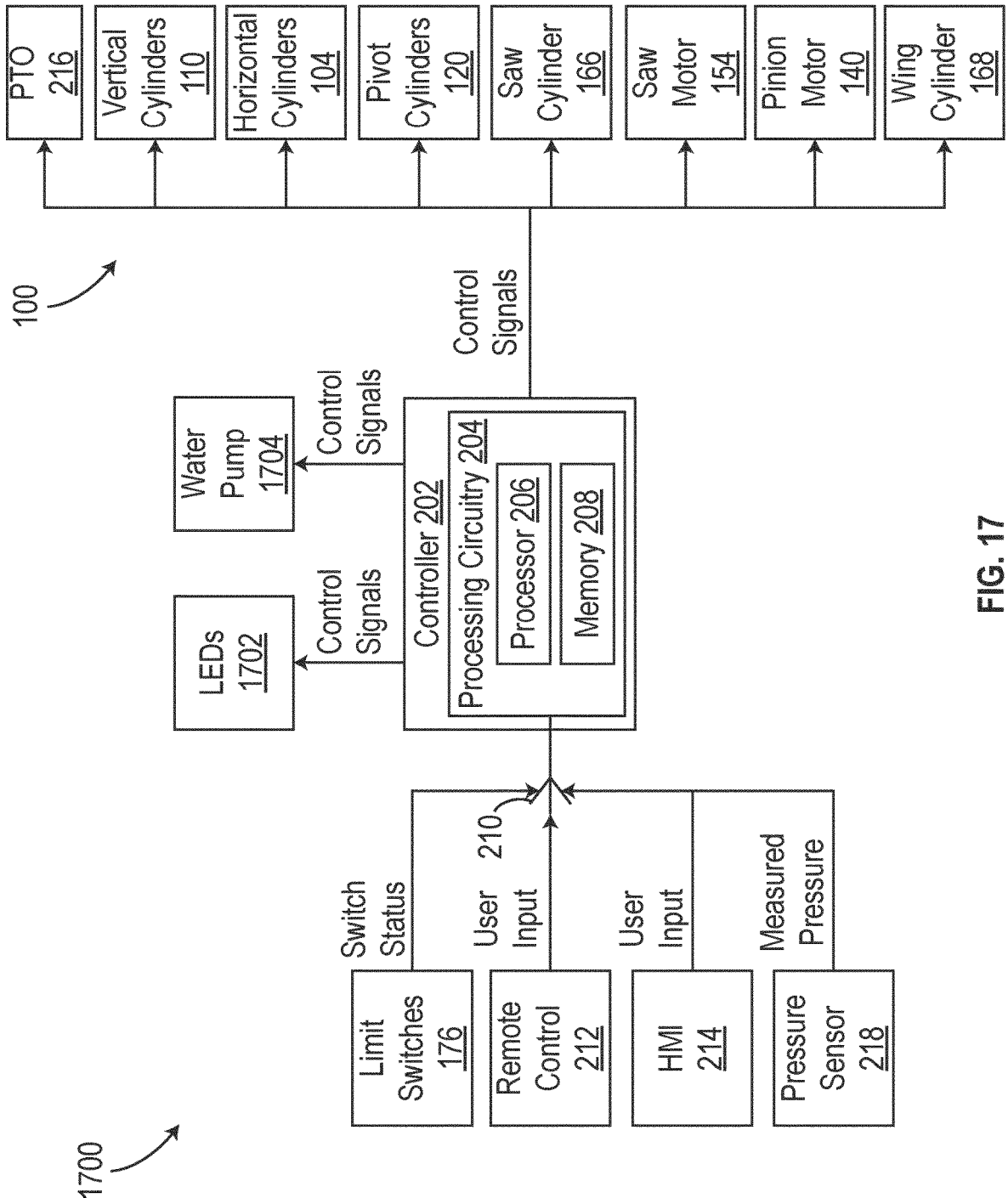
FIG. 17 is a block diagram of a control system for the curb cutting vehicle of FIG. 1, according to some embodiments.

Referring to FIG. 17, a control system 1700 of the vehicle 10 (or the curb cutting assembly 100) includes a controller 202, a remote control 212, an HMI 214, the limit switches 176, light emitting diodes (LEDs) 1702, a water pump 1704, the PTO 216, the vertical lift cylinders 110, the horizontal extension cylinders 104, the pivot cylinders 120, the saw cylinder 166, the saw motor 154, the pinion motor 140, and the wing cylinders 168. The controller 202 is configured to receive user inputs from the remote control 212 and/or the HMI 214 and generate control signals for any of the LEDs 1702, the water pump 1704, the PTO 216, the vertical cylinders 110, the horizontal cylinders 104, the pivot cylinders 120, the saw cylinder 166, the saw motor 154, the pinion motor 140, and the wing cylinders 168 according to the user inputs. In some embodiments, the remote control 212 is configured to control operation of any functions performed at the saw assembly 150 or on the carriage 158. In some embodiments, any of the functionality of the remote control 212 can be performed at a mobile device (e.g., a smartphone) that includes a mobile application that configures the mobile device to communicate with the controller 202 and provide inputs to the controller 202 for cutting the curb 302.

In some embodiments, the HMI 214 is or includes an HMI that is positioned within the cab 14 of the vehicle 10. In some embodiments, the HMI 214 is or includes the levers 502 for controlling the corresponding valves of the valve bank 500. The HMI 214 may include any physical input devices for operating corresponding components of the vehicle 10 or the curb cutting assembly 100.

Referring particularly to FIG. 17, the controller 202 includes a circuit, shown as processing circuitry 204, a processor, shown as processor 206, and memory, shown as memory 208, according to an exemplary embodiment. Controller 202 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 17, controller 202 includes the processing circuitry 204 and memory 208. Processing circuitry 204 may include an ASIC, one or more FPGAs, a DSP, circuits containing one or more processing components, circuitry for supporting a microprocessor, a group of processing components, or other suitable electronic processing components (e.g., processor 206). In some embodiments, processing circuitry 204 is configured to execute computer code stored in memory 208 to facilitate the activities described herein. Memory 208 may be any volatile or non-volatile computer-readable storage medium capable of storing data or computer code relating to the activities described herein. According to an exemplary embodiment, memory 208 includes computer code modules (e.g., executable code, object code, source code, script code, machine code, etc.) configured for execution by processing circuitry 204. In some embodiments, controller 202 may represent a collection of processing devices (e.g., servers, data centers, etc.). In such cases, processing circuitry 204 represents the collective processors of the devices, and memory 208 represents the collective storage devices of the devices.

The controller 202 may receive control inputs from the remote control 212 and/or the HMI 214 to transition the curb cutting assembly 100 and the vehicle 10 between the transport mode, the setup mode, and the work mode. In some embodiments, the controller 202 is configured to limit one or more operations of the curb cutting assembly 100 based on the mode. For example, when the vehicle 10 is in the transport mode, the controller 202 may limit operation of the PTO 216, the vertical cylinders 110, the horizontal cylinders 104, the pivot cylinder 120, the saw cylinder 166, the saw motor 154, the pinion motor 140, and the wing cylinder 168. In the setup mode, the controller 202 allows activation or operation of the PTO 216, and the vertical cylinders 110, the horizontal extension cylinders 104, and the pivot cylinders 120, but limit operation of the saw cylinder 166, the saw motor 154, and the pinion motor 140. In the work mode, the controller 202 may allow operation of any of the components of the curb cutting assembly 100.

The controller 202 may receive control inputs from the remote control 212 to control operation of one or more of the PTO 216, the vertical cylinders 110, the horizontal cylinders 104, the pivot cylinders 120, the saw cylinder 166, the saw motor 154, the pinion motor 140, and the wing cylinders 168. In some embodiments, the pivot cylinders 120 and the horizontal extension cylinders 104 are manually operable at the HMI 214 (e.g., by operating the levers 502 at the valve bank 500). The controller 202 can also receive positional feedback from any sensors that measure extension or retraction or position of any of the hydraulic cylinders, telescoping members, rotatable members, etc., of the carriage assembly 150, the curb cutting assembly 100, etc.

In some embodiments, the controller 202 includes a wireless transceiver 210 that is configured to facilitate wireless communications between the controller 202 and one or more electronic devices of the vehicle 10 or the control system 1700 (e.g., the remote control 212). The controller 202 may communicate with any of the electric devices wirelessly via the wireless transceiver 210, or may communicate via a wired connection or communications system of the vehicle 10. In some embodiments, the controller 202 is configured to operate the water pump 1704 to pressurize water from a water reservoir and spray the water onto the blade 156 while performing a cutting operation (e.g., while cutting the curb 302). In some embodiments, the controller 202 can receive control inputs from the remote control 212 and/or the HMI 214 to align the saw assembly 150 for performing a desired cut. In some embodiments, once the saw assembly 150 is oriented for performing a cut, the user may provide an input via the remote control 212 to start the saw assembly 150 and the controller 202 starts the saw motor 154 so that the blade 156 rotates at an appropriate speed. The controller 202 can then control the saw cylinder 166 to extend the saw 103 a cutting depth. The depth of the saw 103 (e.g., translation towards the curb 302) may be performed automatically by the controller 202 (e.g., based on image data, measured pressure feedback, etc.) or manually based on user inputs from the remote control 212. Once the saw 103 is translated and cuts through a width of the curb 302, the controller 202 may activate the pinion motor 140 to operate the saw assembly 150 to translate along the wing 112 at an appropriate speed (e.g., a speed set by the user, a predetermined speed for cutting, etc.).

The pinion motor 140 may stop operating at an end of the cut responsive to indication of a proximity sensor, image data from a camera indicating that the saw 103 has completed a desired cut (e.g., that the saw 103 is proximate a marker on the curb such as a visual indicator or a digital coordinate), or may be stopped by a user input received at the controller 202 from the remote control 212 (or a control panel) that the cut is completed. In some embodiments, the remote control 212 includes a toggle switch, and the controller 202 continues operating the pinion motor 140 to walk the saw assembly 150 along the wing 112 while the toggle switch is held (e.g., at the predetermined speed) until the toggle switch is released by the user. The controller 202 may automatically operate the saw cylinder 166 to maintain a complete cut or appropriate cut depth of the saw 103 as the saw assembly 150 walks along or translates along the wing 112 (e.g., if the curb 302 curves towards or away from the vehicle 10 in a lateral direction). In some embodiments, the remote control 212 includes a cruise button that can be pressed to start operation of the pinion motor 140 to walk the saw assembly 150 along the wing 112, and pressed again to stop the operation of the pinion motor 140 from walking the saw assembly 150 down the wing 112 (e.g., once a desired length of the cut has been completed). The saw 103 can be extended or retracted (e.g., the controller 202 operates the saw cylinder 166 to extend or retract) by operating a corresponding toggle switch of the remote control 212. In some embodiments, one or more switches, toggle switches, buttons, etc., of the remote control 212 are multi-purpose and control different elements or hydraulic components of the vehicle 10 or the curb cutting assembly 100 in different modes of operation (e.g., the setup mode versus the work mode).

The remote control 212 can also include a button that, when pressed, causes the controller 202 to activate or deactivate the saw motor 154 and/or the water pump 1704.

In some embodiments, the controller 202 is configured to operate the LEDs 1702 to indicate a selected direction of travel of the saw assembly 150 along the wing 112 prior to activation of the pinion motor 140.

In some embodiments, the controller 202 is configured to operate the saw assembly 150 to walk along the second wing section 112*b* (or the third wing section) to perform an angled cut of the curb 302. In some embodiments, the controller 202 is configured to limit translation or movement of the saw assembly 150 off of the second wing section 112*b* (or the third wing section) when the saw assembly 150 is along the second wing section 112*b* responsive to a switch status reported by the limit switches 176 indicating that the second wing section 112*b* or the third wing section are rotated relative to the first wing section 112*a* (e.g., by operation of the wing cylinders 168 responsive to control signals generated by the controller 202 responsive to user inputs from the remote control 212). The saw assembly 150 may be transported to the second wing section 112*b* or the third wing section at the opposite end by operation of the remote control 212. The operator can adjust a toggle switch of the remote control 212 to cause the controller 202 to operate the wing cylinders 168 to pivot or rotate the second wing section 112*b* or the third wing section to a desired orientation. The operator may then operate the remote control 212 to cause the controller 202 to start the saw motor 154, plunge the saw blade 156 into the curb 302 at an angle by operating the saw cylinder 166, and walk the saw assembly 150 along the second wing section 112*b* or the third wing section by operating the pinion motor 140 to thereby make an angled cut at either end of the straight cut performed when the wing sections 112 are aligned.

Figure 21:
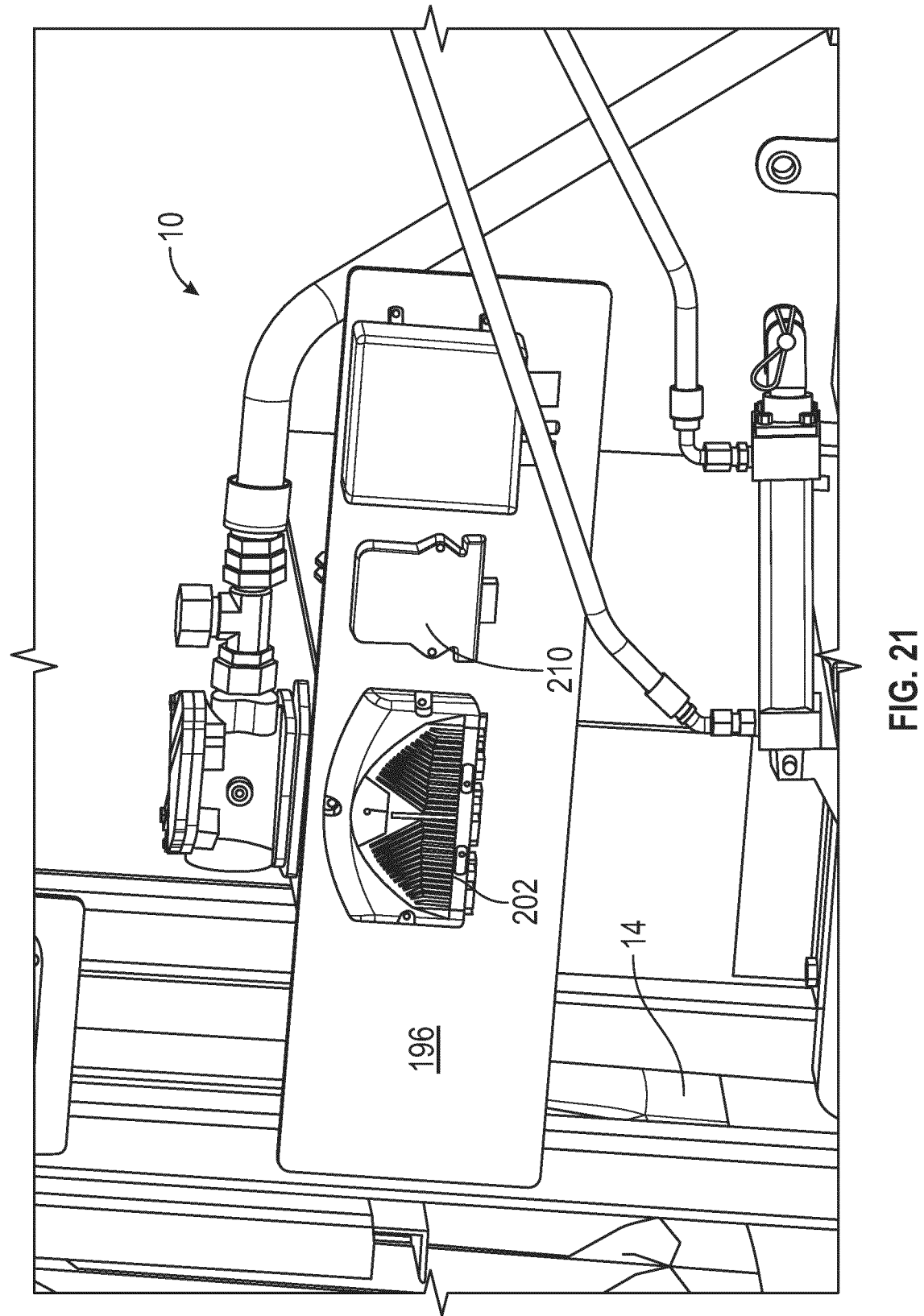
FIG. 21 is a perspective view of a portion of the curb cutting vehicle of FIG. 1 illustrating positioning of a controller and wireless transceiver, according to some embodiments.

The controller 202 is configured to obtain a measured pressure from a pressure sensor 218 that is positioned within an extension chamber of the saw cylinder 166. In some embodiments, the controller 202 is configured to compare the measured pressure to a threshold or predetermined pressure. If the measured pressure exceeds the threshold or predetermined pressure or exceeds the threshold or predetermined pressure by an amount, the controller 202 determines that the saw blade 156 is dull (e.g., resulting in increased pressure to plunge the saw blade 156 through the curb 302) and may operate a display screen (e.g., positioned within a cab of the vehicle 10, on a control panel of the vehicle 10, on the remote control 212, etc.) to notify the operator or user that the saw blade 156 is dull and should be replaced. In some embodiments, the controller 202 is configured to monitor average pressure or average pressure spikes as read by the pressure sensor 218 over time (e.g., when the saw cylinder 166 is extended while the saw motor 154 operates to drive the saw blade 156), and determine deviations over time (e.g., increased pressure or increased trend in pressure required to plunge the saw blade 156 into the curb 302) to identify a sharpness or dullness of the saw blade 156. As shown in FIG. 21, the controller 202 and the transceiver 210 may be positioned on a plate 196 that is positioned directly rearwards of the cab 14.

In some embodiments, the controller 202 is configured to receive feedback from a sensor of the reservoir 504 or an oil reservoir, and limit operation of the curb cutting assembly 100 responsive to low oil or hydraulic fluid levels. In some embodiments, the controller 202 is also configured to receive temperature measurements of the oil or the hydraulic fluid, and in response to the temperature of the oil or hydraulic fluid exceeding a threshold temperature, limiting activation of the curb cutting assembly 100 or shutting off operation of the curb cutting assembly 100. In some embodiments, the remote control 212 also includes an e-stop button that can be pressed in order to shut off the curb cutting assembly 100.

Process

Referring to FIG. 18, a flow diagram of a process 1800 for cutting a curb includes steps 1802-1824, according to some embodiments. In some embodiments, the process 1800 is performed by the control system 1700. The process 1800 can be performed in order to transport a curb cutting assembly to a jobsite, set up the curb cutting assembly for cutting a curb, and performing a cut of the curb. In some embodiments, the process 1800 is performed using the curb cutting assembly 100 of the vehicle 10.

Process 1800 includes starting an engine of a vehicle equipped with a curb cutting assembly (step 1802), according to some embodiments. In some embodiments, step 1802 is performed by turning a key or pressing a button of the vehicle 10 within the cab 14 of the vehicle 10. In some embodiments, step 1802 is performed by an operator of the vehicle 10 or by the controller 202.

Process 1800 includes aligning the vehicle with a center mark of a target curb (step 1804), according to some embodiments. In some embodiments, step 1804 is performed by performing a driving operation to transport the vehicle 10 to an approximate centerpoint of the target curb, or a center point of a cut. In some embodiments, one or more markers for ends of the cut of the curb and a center of the cut of the curb are placed in order to facilitate performing step 1804. In some embodiments, step 1804 is performed by a driveline (e.g., the prime mover, the transmission, etc.) of the vehicle 10.

Process 1800 includes transitioning the transmission of the vehicle into a park gear (step 1806), according to some embodiments. Transitioning the vehicle 10 into the park gear may be initiated at an HMI in the cab 14 of the vehicle 10, or by pressing a button on the remote control 212. In some embodiments, the prime mover 18 still operates to provide torque output when the transmission is in the park gear. In some embodiments, step 1806 is initiated by an operator of the vehicle and performed by the transmission 20.

Process 1800 includes activating a power take off (PTO) of the vehicle to pressurize a hydraulic system of the vehicle (step 1808), according to some embodiments. In some embodiments, step 1808 is prevented from being performed until step 1806 is performed. Step 1808 may include activating or engaging the clutch 508 of the PTO 216 so that the PTO 216 is driven by the prime mover 18 (e.g., through the transmission 20) and drives the pump 506 to pressurize hydraulic components of the curb cutting assembly (e.g., lift cylinders, valve banks, manifolds, hydraulic motors, etc. of the curb cutting assembly 100). In some embodiments, step 1808 is performed by the controller 202 and the clutch 508.

Process 1800 includes transitioning the vehicle and the curb cutting assembly into a setup mode (step 1810), according to some embodiments. In some embodiments, step 1810 is initiated by the operator or user by pressing a button on the remote control 212. In some embodiments, step 1810 is performed by the controller 202. In some embodiments, transitioning the vehicle and the curb cutting assembly into the setup mode allows activation or control of one or more hydraulic or operable components of the curb cutting assembly 100.

Process 1800 includes activating a frame mounted valve assembly responsive to the setup mode (step 1812), according to some embodiments. In some embodiments, step 1812 is performed automatically in response to step 1810. In some embodiments, step 1810 is performed by the controller 202.

Step 1810 can include allowing control of one or more hydraulic components by user input at the valve bank 500.

Process 1800 includes operating main lift cylinders and extension cylinders to lift a main beam (e.g., the wing 112) of the curb cutting assembly out of a cradle of the vehicle (step 1814), according to some embodiments. In some embodiments, step 1814 is performed by the hydraulic system 1900 by operation of the levers 502 so that the vertical lift cylinders 102 and the horizontal extension cylinders 104 move the wing 112 out of engagement with the cradle assembly 22 and position the saw assembly 150 proximate the curb 302.

Process 1800 includes operating cylinders of the curb cutting assembly to position a saw at a desired location proximate the target curb (step 1816), according to some embodiments. In some embodiments, step 1816 includes controlling or adjusting operation of the vertical cylinders 110, the horizontal cylinders 104, the pivot cylinders 120, the wing cylinders 168, etc., to position the saw 103 proximate a center or an end of a desired cut of the target curb. In some embodiments, step 1816 is performed responsive to the user providing one or more inputs via the remote control 212 or the HMI 214.

Process 1800 includes transitioning the vehicle and the curb cutting assembly into a work mode (step 1818) and operating the saw and one or more cylinders or hydraulic motors to cut the target curb while the saw walks along the main beam (step 1820), according to some embodiments. In some embodiments, step 1818 is performed to allow activation of the saw motor 154 and the saw cylinder 166. In some embodiments, step 1820 is performed responsive to manual inputs at the remote control 212. In some embodiments, step 1820 or portions of step 1820 (e.g., walking along the wing 112) are performed semi-autonomously by the controller 202 and are initiated or stopped based on a user input at the remote control 212.

Process 1800 includes transitioning the vehicle and the curb cutting assembly into the setup mode (step 1822) and operating the main lift cylinders and extension cylinders to return the main beam of the curb cutting assembly to the cradle of the vehicle (step 1824), according to some embodiments. Steps 1822 and 1824 can be performed once the desired cut is performed on the target curb. Steps 1822 and 1824 can be performed similarly to steps 1812-1816 in order to return the wing 112 to the cradle. Once the wing 112 is returned to the cradle assembly 22, process 1800 may conclude with transitioning into a transport mode and transporting to a next jobsite.

Rotatable Carriage

Figure 22:
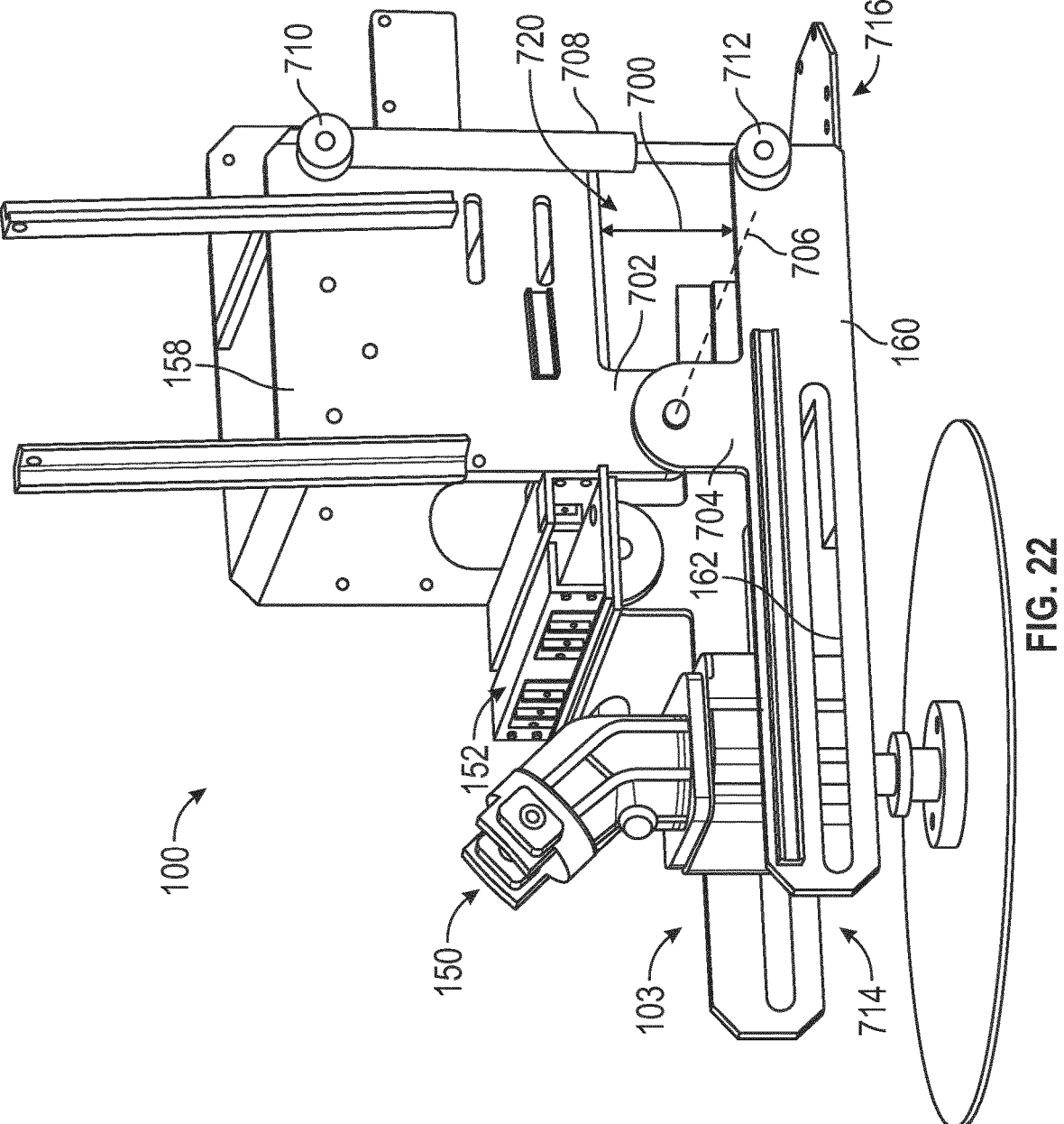
FIG. 22 is a perspective view of a saw assembly of the curb cutting vehicle of FIG. 1 including a carriage having a member that pivots relative to a main portion of the carriage and configured to support a concrete saw, according to some embodiments.
Figure 23:
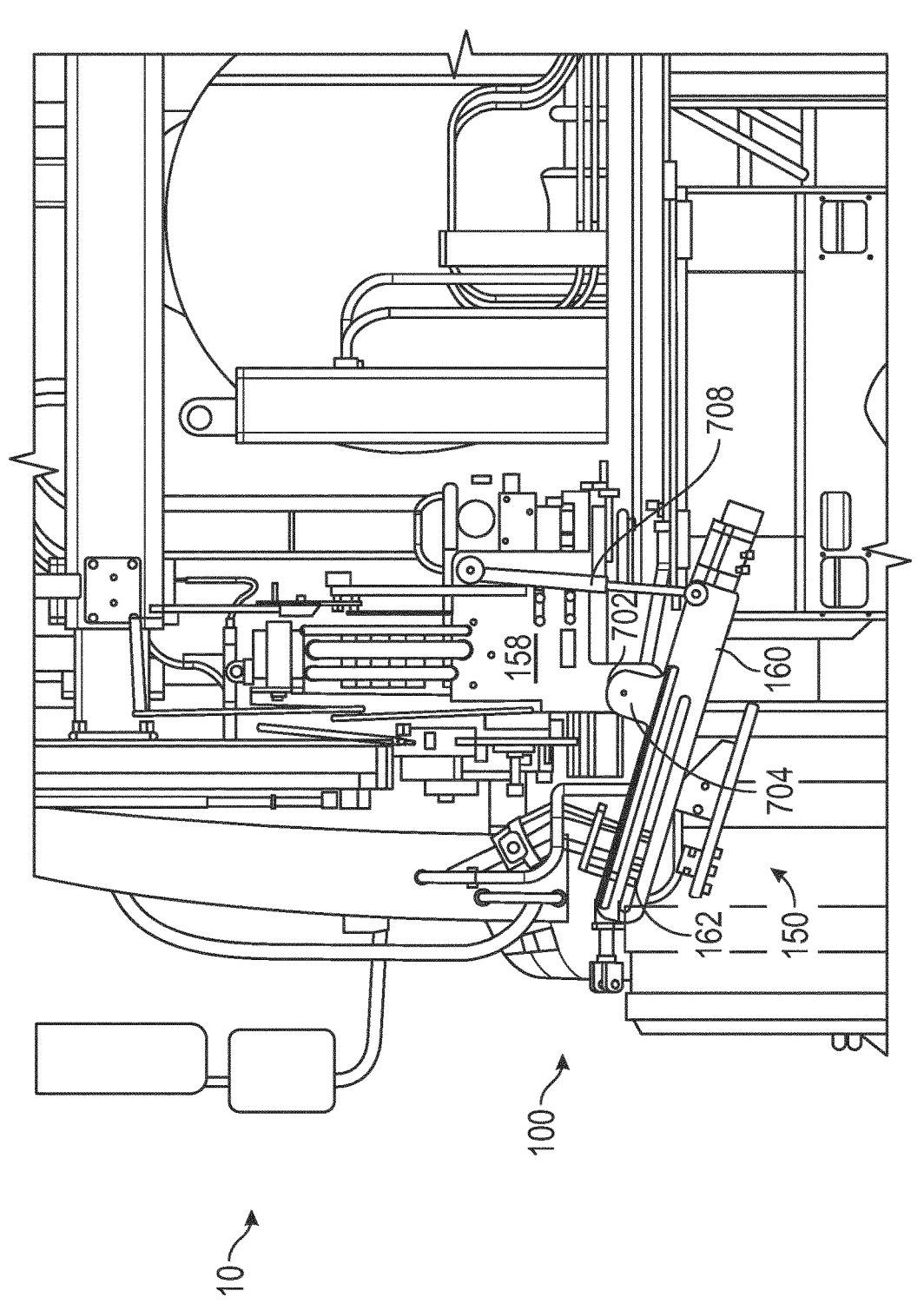
FIG. 23 is a side view of the saw assembly of FIG. 22 with the member and the concrete saw in a first angular position relative to the main portion of the carriage, according to some embodiments.
Figure 24:
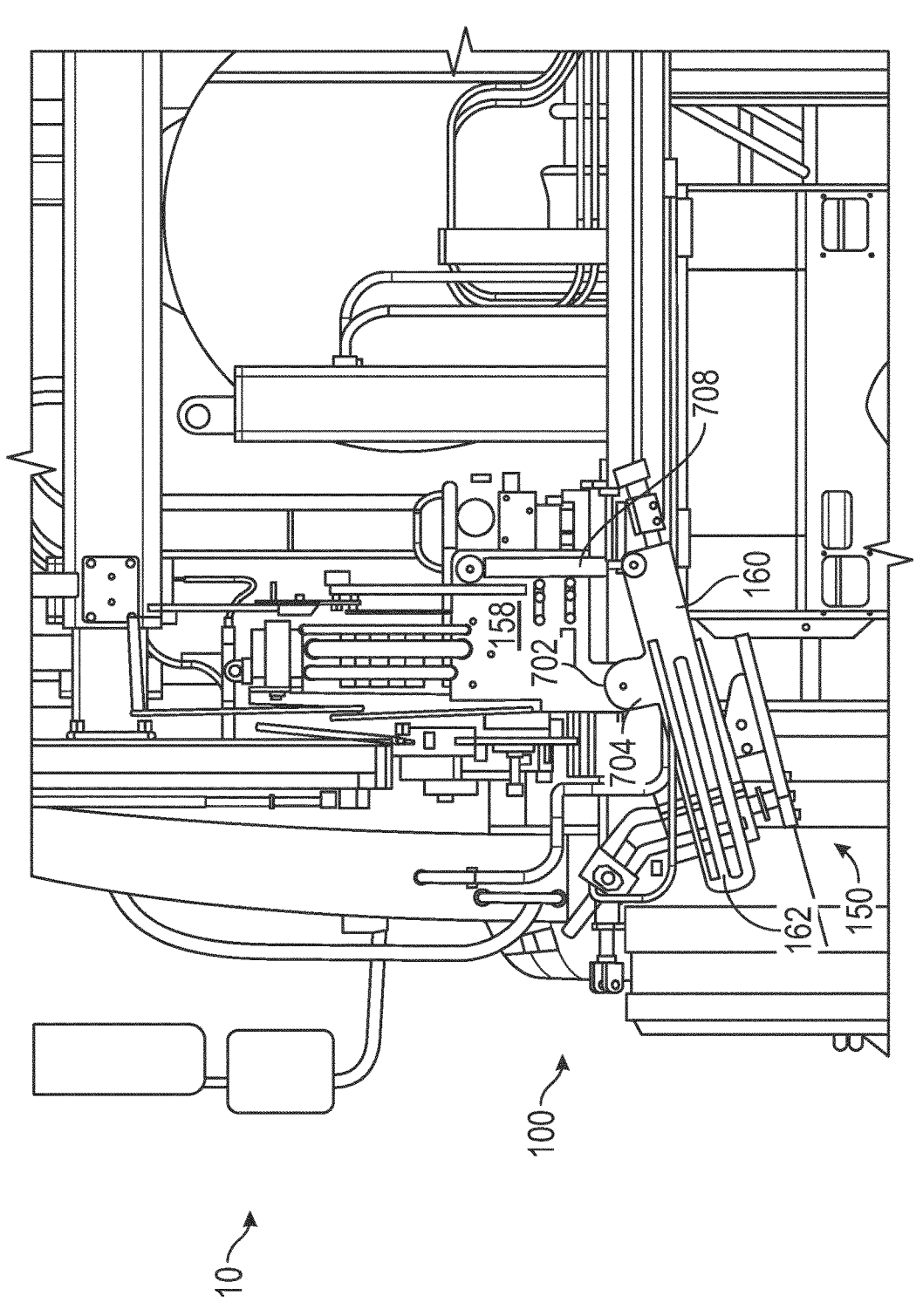
FIG. 24 is a side view of the saw assembly of FIG. 22 with the member and the concrete saw in a second angular position relative to the main portion of the carriage, according to some embodiments.

Referring to FIGS. 22-24, the saw assembly 150 includes the carriage 158 and the elongated members 160 that define the slots 162, with the carriage 158 and the elongated members 160 provided as separate members that are pivotally or rotatably coupled with each other, according to some embodiments. The carriage 158 is configured to facilitate coupling of the saw assembly 150 with the wing 112 such that the saw assembly 150 is configured to travel along the wing 112 in either direction to perform a cut. The hook 152 can be provided as a receiving member (e.g., a pair of hooks on opposite sides including a slot formed between the hooks for receiving the wing 112) that is fastened (e.g., removably coupled, bolted, interlocked, attached, etc.) with the carriage 158 such that the saw assembly 150 can be driven to translate along the wing 112. In some embodiments, the hook 152 is welded or integrally formed with the carriage 158.

Referring particularly to FIG. 22, the elongated members 160 that define the slots 162 include corresponding tabs, protrusions, coupling portions, etc., shown as members 704. The members 704 may extend from a top of the elongated members 160 towards the carriage 158 which is positioned above the elongated members 160. The carriage 158 may similarly include corresponding tabs, protrusions, coupling portions, etc., shown as members 702 that extend downwards from the carriage 158 towards the elongated members 160. The members 702 and the members 704 may each include openings (e.g., apertures, holes, bores, spaces, etc.) configured to receive a pin or member such that the elongated members 160 are suspended from the carriage 158 and are rotatable or pivotable relative to the carriage 158 about the pin that extends through the members 702 and the members 704. In some embodiments, the elongated members 160 support the saw 103 and are suspended from (e.g., pivotally coupled with a bottom of) the carriage 158. In some embodiments, a space 720 (e.g., a gap) is defined between the carriage 158 and the elongated members 160. The space 720 may have a distance 700 between the bottom of the carriage 158 and the elongated members 160 when the elongated members 160 are parallel with the carriage 158. The distance 700 may be 5 inches. In some embodiments, the saw assembly 150 includes an actuator 708 that is positioned on a rear of the carriage 158 and the elongated members 160 (e.g., a side of the carriage 158 and the elongated members 160 opposite the saw 103) a distance rearwards of a pivot point between the elongated members 160 and the carriage 158. The pivotal coupling between the carriage 158 and the elongated members 160 (e.g., at the pin between the members 702 and the members 704) may be defined by the axis 706 about which the elongated member 160 rotates or pivots relative to the carriage 158. In some embodiments, the actuator 708 is rotatably coupled with the carriage 158 at a first end 710 and rotatably coupled with the elongated members 160 at a second end 712. The actuator 708 is rotatably or pivotally coupled with the carriage 158 at the first end 710 at an upper end of the carriage 158. The actuator 708 is rotatably or pivotally coupled at the second end 712 with a rear end 716 of the elongated members 160 which is rearwards of the pivot point. The slot 162 is defined from a front end 714 (e.g., a first end) of the elongated members 160 and extends a length of the elongated members 160, terminating at substantially a position of the pivot point of the axis 706.

Referring to FIG. 23, the saw assembly 150 is shown with the actuator 708 in an extended (e.g., fully extended) position such that the saw 103 and the elongated members 160 are rotated in a direct direction about the axis 706. In some embodiments, the actuator 708 has a stroke length of six inches such that the actuator 708 may extend three inches to rotate the elongated members 160 and the saw 103 into the orientation shown in FIG. 23 (e.g., rotate the saw 103 in an upwards direction) or retract three inches to rotate the elongated members 160 and the saw 103 about the axis 706 in an opposite direction (e.g., such that the saw 103 is rotated downwards) to the orientation shown in FIG. 24. In some embodiments, the orientation of the saw 103 shown in FIG. 23 is rotated upwards from the parallel position (shown in FIG. 22) 17 degrees, and the orientation of the saw 103 shown in FIG. 24 is rotated downwards from the parallel position (shown in FIG. 22) 17 degrees. In this way, the saw 103 and the elongated members 160 may be rotated an angular amount (e.g., a tilt amount) of 35 degrees (e.g., 17 degrees in a first direction and 17 degrees in a second direction from parallel). The axis 706 may be substantially parallel with the wing 112 or a section of the wing 112 at which the saw assembly 150 is currently positioned. Advantageously, the pivotal coupling between the carriage 158 and the elongated members 160 facilitates an additional 17 degrees of rotation or tilt of the saw 103 in either direction (e.g., by extending or retracting the actuator 708). In some embodiments, the saw assembly 150 (e.g., the carriage 158 and the elongated members 160) is substantially similar to the saw assembly 150 as described in greater detail above with reference to FIGS. 1-14, but has a greater vertical height or size.

Referring again to FIGS. 22-24, the actuator 708 may be a linear electric actuator, a pneumatic actuator, or a hydraulic actuator. The actuator 708 may be configured to receive hydraulic fluid from the hydraulic system 1900 and may include a corresponding valve configured to direct a direction of flow of the hydraulic fluid. For example, the actuator 708 may be a double action cylinder to facilitate bi-directional control of the actuator 708 (e.g., extension and retraction of the actuator 708 to drive rotation of the elongated members 160 and the saw 103 relative to the carriage 158 in a first direction or a second direction).

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication net-work). Examples of communication networks include a LAN and a WAN, an inter-network (e.g., the Internet), and peer-to-peer networks (e.g., ad hoc peer-to-peer networks).

It is important to note that the construction and arrange-ment of the vehicle 10 and the systems and components thereof (e.g., the prime mover 18, the curb cutting assembly 100, the control system 200, etc.) as shown in the various exemplary embodiments is illustrative only. Additionally, any element disclosed in one embodiment may be incorpo-rated or utilized with any other embodiment disclosed herein.

What is claimed is:

1. A vehicle comprising:

an engine mounted on a chassis; and a curb cutting assembly mounted on the chassis, the curb cutting assembly comprising:

a main beam;

a saw assembly configured to transport along the main beam;

a plurality of vertical cylinders configured to raise and lower the main beam in a vertical direction;

a plurality of horizontal cylinders configured to extend or retract the main beam in a lateral direction;

a plurality of pivot cylinders coupled at first ends with a cradle assembly of the vehicle and at second ends with the horizontal cylinders, the plurality of pivot cylinders configured to extend or retract to pivot the main beam, the plurality of horizontal cylinders, and the plurality of vertical cylinders about a longitudinal direction, the plurality of pivot cylinders configured to exert a downwards force to raise the main beam; and a pump configured to be driven by the engine and pressurize hydraulic fluid for the saw assembly, the plurality of vertical cylinders, the plurality of hori-zontal cylinders, and the plurality of pivot cylinders.

2. The vehicle of claim 1, wherein the saw assembly comprises a carriage configured to support a concrete saw, a first hydraulic motor configured to drive the concrete saw, a second hydraulic motor configured to drive a pinion gear, and a saw extension cylinder configured to extend or retract to move the concrete saw along a slot of the carriage.

3. The vehicle of claim 2, wherein the main beam com-prises an edge configured to support the carriage of the saw assembly, the main beam further comprising a rack config-ured to engage the pinion gear, wherein the second hydraulic motor is configured to drive the pinion gear that engages the rack to transport the saw assembly along the main beam.

4. The vehicle of claim 1, further comprising a power take off (PTO), the PTO selectably transitionable between an engaged state such that the engine is rotationally coupled with and drives the pump, and a disengaged state such that the engine is rotationally de-coupled from the pump.

5. The vehicle of claim 1, wherein the curb cutting assembly is operable to position the saw assembly proximate a curb, plunge a saw blade of the saw assembly into the curb while driving the saw blade, and transport the saw assembly along the main beam to cut the curb.

6. The vehicle of claim 1, wherein the main beam com-prises a medial portion, and a pair of end portions positioned at opposite ends of the medial portion, the end portions pivotally coupled with the medial portion so that the saw assembly is rotatable to perform an angled cut of a curb while operating and transporting along one of the end portions of the main beam.

7. The vehicle of claim 1, wherein the saw assembly comprises a carriage and a pair of elongated members, the pair of elongated members pivotally coupled with the car-riage and configured to be driven to rotate relative to the carriage by an actuator, the pair of elongated members defining a slot for a concrete saw of the saw assembly configured to cut the curb, the carriage configured to travel along the main beam.

8. A curb cutting assembly for a vehicle, the curb cutting assembly comprising:

a main beam;

a saw assembly configured to transport along the main beam;

a plurality of vertical cylinders configured to raise and lower the main beam in a vertical direction;

a plurality of horizontal cylinders configured extend or retract the main beam in a lateral direction;

a plurality of pivot cylinders coupled at first ends with a cradle assembly of the vehicle and at second ends with the horizontal cylinders, the plurality of pivot cylinders configured to extend or retract to pivot the main beam, the plurality of horizontal cylinders, and the plurality of vertical cylinders about a longitudinal direction, the plurality of pivot cylinders configured to exert a down-wards force to raise the main beam; and a pump configured to be driven by the engine and pres-surize hydraulic fluid for the saw assembly, the plural-ity of vertical cylinders, the plurality of horizontal cylinders, and the plurality of pivot cylinders;

wherein the curb cutting assembly is mounted on the vehicle with the main beam extending longitudinally along the vehicle.

9. The curb cutting assembly of claim 8, wherein the saw assembly comprises a carriage configured to support a concrete saw, a first hydraulic motor configured to drive the concrete saw, a second hydraulic motor configured to drive a pinion gear, and a saw extension cylinder configured to extend or retract to move the concrete saw along a slot of the carriage.

10. The curb cutting assembly of claim 9, wherein the main beam comprises an edge configured to support the carriage of the saw assembly, the main beam further com-prising a rack configured to engage the pinion gear, wherein the second hydraulic motor is configured to drive the pinion gear that engages the rack to transport the saw assembly along the main beam.

11. The curb cutting assembly of claim 8, further com-prising a power take off (PTO), the PTO selectably transi-tionable between an engaged state such that the engine is rotationally coupled with and drives the pump, and a dis-engaged state such that the engine is rotationally de-coupled from the pump.

12. The curb cutting assembly of claim 8, wherein the curb cutting assembly is operable to position the saw assem-bly proximate a curb, plunge a saw blade of the saw assembly into the curb while driving the saw blade, and transport the saw assembly along the main beam to cut the curb.

13. The curb cutting assembly of claim 8, wherein the main beam comprises a medial portion, and a pair of end portions positioned at opposite ends of the medial portion, the end portions pivotally coupled with the medial portion so that the saw assembly is rotatable to perform an angled cut of a curb while operating and transporting along one of the end portions of the main beam.

14. The curb cutting assembly of claim 8, wherein the saw assembly comprises a carriage and a pair of elongated members, the pair of elongated members pivotally coupled with the carriage and configured to be driven to rotate relative to the carriage by an actuator, the pair of elongated members defining a slot for a concrete saw, and the carriage configured to travel along the main beam.

15. A system for cutting a curb, the system comprising:
a vehicle comprising a chassis, a plurality of tractive elements, and a primary mover configured to drive the plurality of tractive elements to transport the vehicle;
a curb cutting assembly coupled with the chassis, the curb cutting assembly comprising a saw assembly configured to transport along a main beam, the main beam configured to be driven to raise or lower relative to the chassis in a vertical direction, extend or retract in a lateral direction from a side of the vehicle, and pivot about a longitudinal axis, the longitudinal axis positioned between the main beam and a pivot cylinder, the pivot cylinder coupled with a horizontal cylinder and the chassis of the vehicle, the pivot cylinder configured to retract or extend to raise or lower the main beam;
wherein the curb cutting assembly is configured to cut a section out of the curb.

16. The system of claim 15, wherein the saw assembly comprises a carriage and a pair of elongated members, the pair of elongated members pivotally coupled with the carriage and configured to be driven to rotate relative to the carriage by an actuator, the pair of elongated members defining a slot for a concrete saw, and the carriage configured to travel along the main beam.

17. The system of claim 15, wherein the curb cutting assembly comprises:

a plurality of vertical cylinders configured to raise and lower the main beam in the vertical direction;
a plurality of the horizontal cylinder configured to extend or retract the main beam in the lateral direction;
a plurality of pivot cylinders configured to extend or retract to pivot the main beam, the plurality of horizontal cylinders, and the plurality of vertical cylinders about the longitudinal axis; and
a pump configured to pressurize hydraulic fluid for the saw assembly, the plurality of vertical cylinders, the plurality of horizontal cylinders, and the plurality of pivot cylinders.

18. The system of claim 15, wherein the saw assembly comprises a carriage configured to support a concrete saw, a first hydraulic motor configured to drive the concrete saw, a second hydraulic motor configured to drive a pinion gear, and a saw extension cylinder configured to extend or retract to move the concrete saw along a slot of the carriage.

19. The system of claim 15, wherein the curb cutting assembly is operable to position the saw assembly proximate the curb, plunge a saw blade of the saw assembly into the curb while driving the saw blade, and transport the saw assembly along the main beam to cut the curb.

20. The system of claim 15, wherein the main beam comprises a medial portion, and a pair of end portions positioned at opposite ends of the medial portion, the end portions pivotally coupled with the medial portion so that the saw assembly is rotatable to perform an angled cut of a curb while operating and transporting along one of the end portions of the main beam.

* * * * *